US011954903B2

(12) United States Patent
Simpson

(10) Patent No.: US 11,954,903 B2
(45) Date of Patent: Apr. 9, 2024

(54) SYSTEM AND METHOD FOR AUTOMATICALLY RECOGNIZING DELIVERY POINT INFORMATION

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 215 days.

(21) Appl. No.: 17/219,328

(22) Filed: Mar. 31, 2021

(65) Prior Publication Data

US 2021/0312222 A1    Oct. 7, 2021

Related U.S. Application Data

(60) Provisional application No. 63/003,726, filed on Apr. 1, 2020.

(51) Int. Cl.
*G06V 10/82* (2022.01)
*G06F 18/2413* (2023.01)
*G06F 18/28* (2023.01)
*G06N 3/08* (2023.01)
*G06V 30/19* (2022.01)
*G06V 30/416* (2022.01)

(52) U.S. Cl.
CPC .......... *G06V 10/82* (2022.01); *G06F 18/2413* (2023.01); *G06F 18/28* (2023.01); *G06N 3/08* (2013.01); *G06V 30/19173* (2022.01); *G06V 30/416* (2022.01)

(58) Field of Classification Search
CPC ........ G06N 3/08; G06V 10/82; G06V 30/416; G06V 30/19173; G06F 18/28; G06F 18/2413
See application file for complete search history.

(56) References Cited

U.S. PATENT DOCUMENTS 5,031,223 A    7/1991  Rosenbaum et al.
5,754,671 A    5/1998  Higgins et al.
(Continued)

FOREIGN PATENT DOCUMENTS

KR    20190103088 A    9/2019

OTHER PUBLICATIONS

Huang, et al. Computer English translation of WIPO Publication No. WO 2019/105258 A1, pp. 1-12. (Year: 2019).*

(Continued)

*Primary Examiner* — Daniel G Mariam
(74) *Attorney, Agent, or Firm* — Knobbe, Martens, Olson & Bear, LLP

(57) ABSTRACT

This application relates to a system for automatically recognizing geographical area information provided on an item. The system may include an optical scanner configured to capture geographical area information provided on an item, the geographical area information comprising a plurality of geographical area components. The system may also include a controller in data communication with the optical scanner and configured to recognize the captured geographical area information by running a plurality of machine learning or deep learning models separately and sequentially on the plurality of geographical area components of the captured geographical area information.

16 Claims, 15 Drawing Sheets

(56) References Cited

U.S. PATENT DOCUMENTS

| | | | |
|---|---|---|---|
| 6,269,171 | B1 | 7/2001 | Gozzo et al. |
| 7,606,741 | B2 | 10/2009 | King et al. |
| 8,271,525 | B2 | 9/2012 | Sharma et al. |
| 8,489,388 | B2 | 7/2013 | Bonnet et al. |
| 9,767,354 | B2 | 9/2017 | Thompson et al. |
| 11,250,452 | B2 * | 2/2022 | Kulkarni ............ G06Q 30/0205 |
| 2008/0027980 | A1 | 1/2008 | Owens et al. |
| 2020/0134014 | A1 * | 4/2020 | Tiwari .................. G06N 20/00 |
| 2021/0312204 | A1 | 10/2021 | Simpson |
| 2021/0406576 | A1 | 12/2021 | Whitestone et al. |

OTHER PUBLICATIONS

Abid et al., Deeparse: A Trainable Postal Address Parser, 2018 Digital Image Computing: Techniques and Applications (DICTA), Canberra, ACT, Australia, 2018, pp. 1-8, doi: 10.1109/DICTA.2018.8615844. (Year: 2018).

* cited by examiner

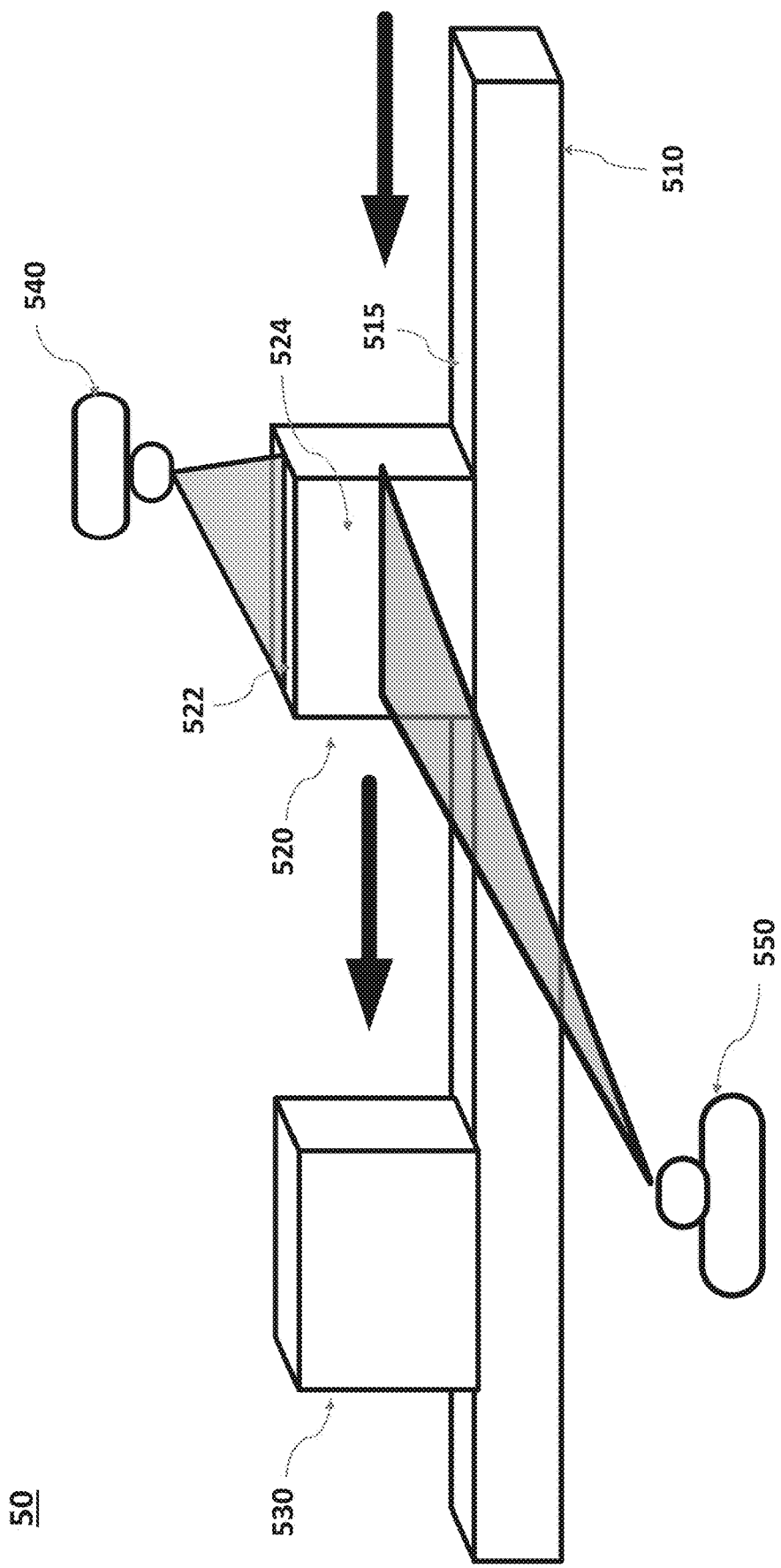

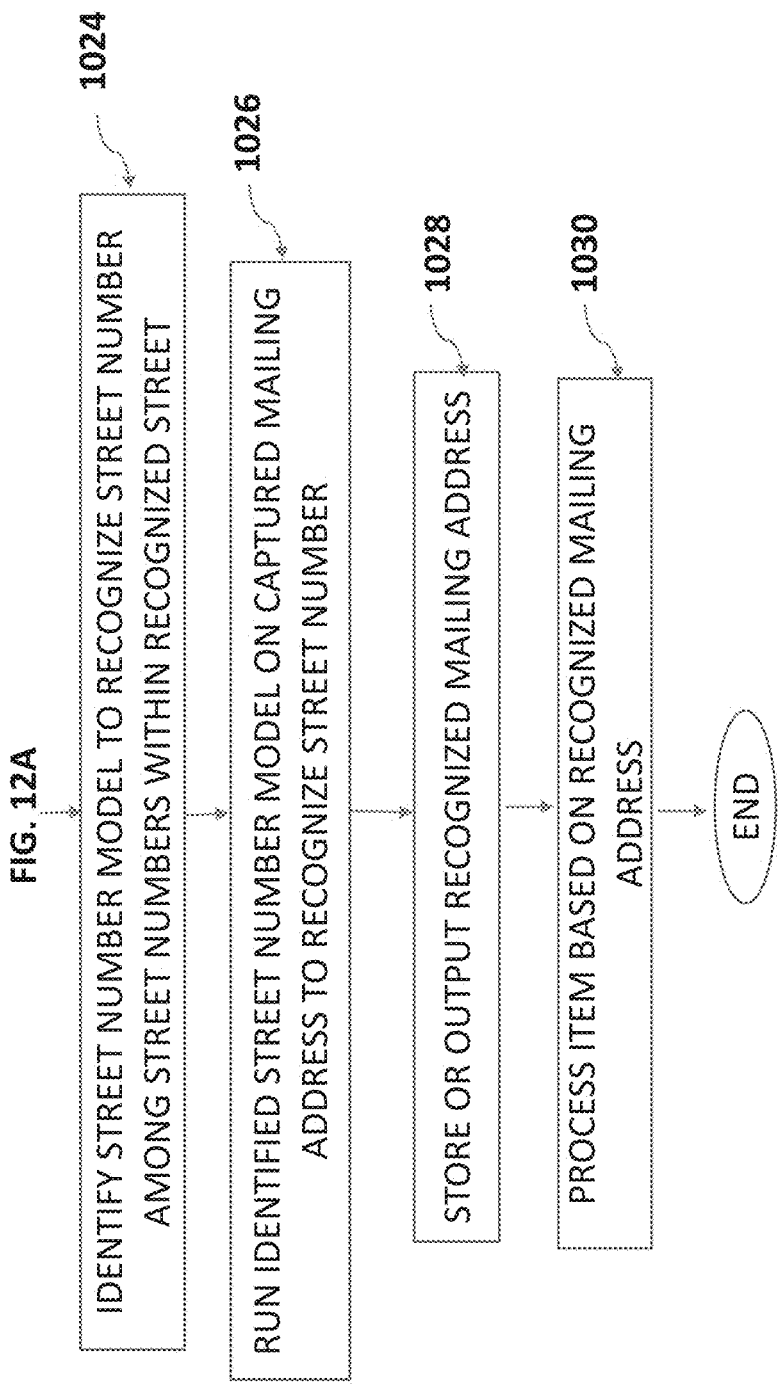

SYSTEM AND METHOD FOR AUTOMATICALLY RECOGNIZING DELIVERY POINT INFORMATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to and the benefit of Provisional Application No. 63/003,726 filed on Apr. 1, 2020 in the U.S. Patent and Trademark Office, the entire contents of which are incorporated herein by reference.

BACKGROUND

Technical Field

The described technology generally relates to image processing, and in particular to a system and method for automatically recognizing delivery information (such as addresses) on an item without the use of an optical character recognition (OCR) process.

Description of the Related Technology

Handling items through processing systems typically includes capturing one or more images of the item as it is being processed. For example, items, such as articles of mail (e.g., letters, flats, parcels, and the like), warehouse inventories, baggage, packages, parcels, containers, or other articles within a logistics system, are frequently received into a processing facility in bulk, and must be sorted into particular groups to facilitate further processes such as, for example, delivery of the item to a specified destination. Sorting items or articles can be done using imaging technologies. The ability to accurately and quickly process a given item may be limited by the effectiveness of the imaging technology to extract and interpret accurate information about each item. The information may include information about the sender or receiver of the item such as name, address, account information, or other item information such as warning labels, hazardous labels, class identifiers, service classes, etc., or other information that is provided in trust that public disclosure will be limited if not avoided altogether. The captured image may go through image processing including, but not limited to, feature detection from the captured image.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for image processing.

One aspect is a system for building machine learning or deep learning data sets for automatically identifying delivery points on distribution items, the system comprising: a first image database configured to store a first plurality of sets of images of geographical area information of items, each of the first plurality of sets of images including an image of an entirety of geographical area information of an item; a second image database configured to store a second plurality of sets of images of the geographical area information of the items, each of the second plurality of sets of images including images of individual geographical area components of geographical area information of an item; and a controller in data communication with the first image database and the second image database, and configured to convert the first plurality of sets of images of the first image database into the second plurality of sets of images and store the converted images in the second image database.

In the above system, the second image database comprises a plurality of second image databases configured to respectively store images of different ones of the geographical area components. In the above system, each of the plurality of second image databases comprises a plurality of second sub-databases configured to respectively store images of different geographical area components. In the above system, the second image database is configured to store images having the same geographical area components in the same second sub-database. In the above system, the geographical area components comprise a largest geographical area component, at least one intermediate geographical area component, a smallest geographical area component and a smallest geographical area number component.

In the above system, the geographical area information comprises an address. In the above system, the geographical area components of the geographical area information comprise a state, a city, a street, and a street number. In the above system, the second image database comprises: a state image database configured to store state images of a plurality of states; a city image database configured to store city images of all constituent cities of each state; a street image database configured to store street images of all constituent streets of each city; and a street number image database configured to store street number images of all constituent street numbers of each street.

In the above system, the state image database comprises a plurality of state image databases configured to respectively store images of different states. In the above system, the different states comprise 50 U.S. states, Washington D.C., and other equivalent U.S. territories. In the above system, the city image database comprises a plurality of city image databases configured to respectively store images of different cities. In the above system, each of the state image databases is configured to communicate data with a plurality of city image databases configured to respectively store city images of all constituent cities of each state.

In the above system, the street image database comprises a plurality of street image databases configured to respectively store images of different streets. In the above system, each of the city image databases is configured to communicate data with a plurality of street image databases configured to respectively store street images of all constituent streets of each city. In the above system, the street number image database comprises a plurality of street number image databases configured to respectively store images of different street numbers. In the above system, each of the street image databases is configured to communicate data with a plurality of street number image databases configured to respectively store street number images of all constituent street numbers of each street.

In the above system, the state image database is configured to store only state images, wherein the city image database is configured to store only city images, wherein the street image database is configured to store only street images and wherein the street number image database is configured to store only street number images. In the above system, the second image database further comprises a postage image database configured to store postage images. In the above system, in converting the first plurality of sets of images into the second plurality of sets of images and storing the converted images in the second image database, the controller is configured to extract images of different geographical area components from the first plurality of sets of images and store the extracted images in portions or sub-databases of the second image database respectively corresponding to the different geographical area components.

The above system further comprises: a reader configured to capture a third plurality of sets of the geographical area information of items and output a third plurality of sets of images different from the first plurality of sets of images, each of the third plurality of sets of images including an image of an entirety of geographical area information of an item, wherein the controller is configured to convert the third plurality of sets of images of the reader into the second plurality of sets of images and store the converted images in the second image database. In the above system, in converting the third plurality of sets of images into the second plurality of sets of images and storing the converted images in the second image database, the controller is configured to extract images of different geographical area components from the third plurality of sets of images and store the extracted images in portions or sub-databases of the second image database respectively corresponding to the different geographical area components.

In the above system, the geographical area information is arranged in a hierarchical structure. In the above system, the geographical area information is arranged from a larger area to a smaller area. In the above system, the geographical area information is arranged from a smaller area to a larger area. In the above system, the second image database is different and separate from the first image database.

Another aspect is a method of building machine learning or deep learning data sets for automatically recognizing geographical area information comprising a plurality of geographical area components provided on items, the method comprising: first storing, at a first image database, a first plurality of sets of images of geographical area information of items, each of the first plurality of sets of images including an image of an entirety of geographical area information of an item; second storing, at a second image database different from the first image database, a second plurality of sets of images of the geographical area information of the items, each of the second plurality of sets of images including images of individual geographical area components of geographical area information of an item; and converting, at a controller, the first plurality of sets of images of the first image database into the second plurality of sets of images and storing the converted images in the second image database.

In the above method, the second image database comprises a plurality of second image databases configured to respectively store images of different ones of the geographical area components. In the above method, each of the plurality of second image databases comprises a plurality of second sub-databases configured to respectively store images of different geographical area components. In the above method, the second storing comprises storing images having the same geographical area components in the same second sub-database. In the above method, the geographical area components comprise a largest geographical area component, at least one intermediate geographical area component, a smallest geographical area component and a smallest geographical area number component.

In the above method, the geographical area information comprises an address. In the above method, the geographical area components of the information comprise a state, a city, a street, and a street number. In the above method, the second storing comprises: storing state images of a plurality of states at a state image database; storing city images of all constituent cities of each state at a city image database; storing street images of all constituent streets of each city at a street image database; and storing street number images of all constituent street numbers of each street at a street number image database.

In the above method, storing the state images comprises storing images of a plurality of different states respectively at a plurality of state image databases. In the above method, storing the city images comprises storing images of a plurality of different cities respectively at a plurality of city image databases. In the above method, storing the street images comprises storing images of a plurality of different streets respectively at a plurality of street image databases. In the above method, storing the street number images comprises storing images of a plurality of different street numbers respectively at a plurality of street number image databases.

In the above method, the state images are stored only in the state image database, wherein the city images are stored only in the city image database, wherein the street images are stored only in the street image database, and wherein the street number images are stored only in the street number image database. In the above method, the second storing comprises storing postage images at a postage image database of the second image database. In the above method, the converting and storing comprises extracting images of different geographical area components from the first plurality of sets of images and storing the extracted images in portions or sub-databases of the second image database respectively corresponding to the different geographical area components.

The above method further comprises: capturing, at a reader, a third plurality of sets of the geographical area information of items and outputting a third plurality of sets of images different from the first plurality of sets of images, each of the third plurality of sets of images including an image of an entirety of geographical area information of an item, wherein the third plurality of sets of images of the reader are converted into the second plurality of sets of images and the converted images are stored in the second image database.

In the above method, the converting and storing comprises extracting images of different geographical area components from the third plurality of sets of images and storing the extracted images in portions or sub-databases of the second image database respectively corresponding to the different geographical area components. In the above method, the geographical area information is arranged in a hierarchical structure. In the above method, the geographical area information is arranged from a larger area to a smaller area. In the above method, the geographical area information is arranged from a smaller area to a larger area.

Another aspect is a system for automatically recognizing geographical area information provided on an item, the system comprising: an optical scanner configured to capture geographical area information provided on an item, the geographical area information comprising a plurality of geographical area components; and a controller in data communication with the optical scanner and configured to recognize the captured geographical area information by running a plurality of machine learning or deep learning models separately and sequentially on the plurality of geographical area components of the captured geographical area information.

In the above system, the geographical area components comprise a largest geographical area component, at least one intermediate geographical area component and a smallest geographical area component. In the above system, the controller is configured to run a first machine learning or deep learning model trained to recognize the largest geographical area component, run a second machine learning or deep learning model trained to recognize the at least one intermediate geographical area component within the recognized largest geographical area component, run a third machine learning or deep learning model trained to recognize the smallest geographical area component within the recognized at least one intermediate geographical area component, in this order.

In the above system, the geographical area components further comprise a smallest geographical area number component. In the above system, the controller is configured to run a fourth machine learning or deep learning model trained to recognize the smallest geographical area number component within the recognized smallest geographical area component, after running the third machine learning or deep learning model. In the above system, the geographical area information comprises an address. In the above system, the geographical area components of the geographical area information comprise a state, a city, a street, and a street number.

The above system further comprises a memory configured to store: a state machine learning or deep learning model trained to recognize the state from the captured geographical area information; a city machine learning or deep learning model trained to recognize the city from all constituent cities of the recognized state; a street machine learning or deep learning model trained to recognize the street from all constituent streets of the recognized city; and a street number machine learning or deep learning model trained to recognize the street number from all constituent street numbers of the recognized street.

In the above system, the state machine learning or deep learning model is configured to communicate data with a plurality of state image databases configured to respectively store images of different states. In the above system, the different states comprise 50 U.S. states, Washington D.C., and other equivalent U.S. territories. In the above system, the city machine learning or deep learning model is configured to communicate data with a plurality of city image databases configured to respectively store images of different cities. In the above system, each of the state image databases is configured to communicate data with a plurality of city image databases configured to respectively store city images of all constituent cities of each state.

In the above system, the street machine learning or deep learning model is configured to communicate data with a plurality of street image databases configured to respectively store images of different streets. In the above system, each of the city image databases is configured to communicate data with a plurality of street image databases configured to respectively store street images of all constituent streets of each city. In the above system, the street number machine learning or deep learning model is configured to communicate data with a plurality of street number image databases configured to respectively store images of different street numbers.

In the above system, each of the street image databases is configured to communicate data with a plurality of street number image databases configured to respectively store street number images of all constituent street numbers of each street. In the above system, the state image databases are configured to store only state images, wherein the city image databases are configured to store only city images, wherein the street image databases are configured to store only street images and wherein the street number image databases are configured to store only street number images. In the above system, the controller is configured to retrieve the state machine learning or deep learning model from the memory and run the retrieved state machine learning or deep learning model to recognize the state from the captured geographical area information.

In the above system, the controller is configured to identify the city machine learning or deep learning model from the memory and run the identified city machine learning or deep learning model to recognize the city within the recognized state. In the above system, the controller is configured to identify the street machine learning or deep learning model from the memory and run the identified street machine learning or deep learning model to recognize the street within the recognized city. In the above system, the controller is configured to identify the street number machine learning or deep learning model from the memory and run the identified street number machine learning or deep learning model to recognize the street number within the recognized street. In the above system, the controller is configured to process the item to be automatically distributed for delivery to the recognized destination Another aspect is a method of automatically recognizing geographical area information provided on an item, the method comprising: capturing, at an optical scanner, geographical area information provided on an item, the geographical area information comprising a plurality of geographical area components; and recognizing, at a controller, the captured geographical area information by running a plurality of machine learning or deep learning models separately and sequentially on the plurality of geographical area components of the captured geographical area information.

In the above method, the geographical area components comprise a largest geographical area component, at least one intermediate geographical area component and a smallest geographical area component. In the above method, the recognizing comprises: running a first machine learning or deep learning model trained to recognize the largest geographical area component; subsequent to running the first machine learning or deep learning model, running a second machine learning or deep learning model trained to recognize the at least one intermediate geographical area component within the recognized largest geographical area component; and subsequent to running the second machine learning or deep learning model, running a third machine learning or deep learning model trained to recognize the smallest geographical area component within the recognized at least one intermediate geographical area component.

In the above method, the geographical area components further comprise a smallest geographical area number component. In the above method, the recognizing comprises: subsequent to running the second machine learning or deep learning model, running a fourth machine learning or deep learning model trained to recognize the smallest geographical area number component within the recognized smallest geographical area component, after running the third machine learning or deep learning model. In the above method, the geographical area information comprises an address. In the above method, the geographical area components of the geographical area information comprise a state, a city, a street, and a street number.

The above method further comprises: storing a state machine learning or deep learning model trained to recognize the state from the captured geographical area information; storing a city machine learning or deep learning model trained to recognize the city from all constituent cities of the recognized state; storing a street machine learning or deep learning model trained to recognize the street from all constituent streets of the recognized city; and storing a street number machine learning or deep learning model trained to recognize the street number from all constituent street numbers of the recognized street. In the above method, the state machine learning or deep learning model is configured to communicate data with a plurality of state image databases configured to respectively store images of different states.

In the above method, the different states comprise 50 U.S. states, Washington D.C., and other equivalent U.S. territories. In the above method, the city machine learning or deep learning model is configured to communicate data with a plurality of city image databases configured to respectively store images of different cities. In the above method, each of the state image databases is configured to communicate data with a plurality of city image databases configured to respectively store city images of all constituent cities of each state. In the above method, the street machine learning or deep learning model is configured to communicate data with a plurality of street image databases configured to respectively store images of different streets.

In the above method, each of the city image databases is configured to communicate data with a plurality of street image databases configured to respectively store street images of all constituent streets of each city. In the above method, the street number machine learning or deep learning model is configured to communicate data with a plurality of street number image databases configured to respectively store images of different street numbers. In the above method, each of the street image databases is configured to communicate data with a plurality of street number image databases configured to respectively store street number images of all constituent street numbers of each street.

In the above method, the state image databases are configured to store only state images, wherein the city image databases are configured to store only city images, wherein the street image databases are configured to store only street images and wherein the street number image databases are configured to store only street number images. In the above method, the recognizing comprises: retrieving the state machine learning or deep learning model from the memory and running the retrieved state machine learning or deep learning model to recognize the state from the captured geographical area information.

In the above method, the recognizing comprises: identifying the city machine learning or deep learning model from the memory and running the identified city machine learning or deep learning model to recognize the city within the recognized state. In the above method, the recognizing comprises: identifying the street machine learning or deep learning model from the memory and running the identified street machine learning or deep learning model to recognize the street within the recognized city.

In the above method, the recognizing comprises: identifying the street number machine learning or deep learning model from the memory and running the identified street number machine learning or deep learning model to recognize the street number within the recognized street. In the above method, the recognizing comprises: identifying the street number machine learning or deep learning model from the memory and running the identified street number machine learning or deep learning model to recognize the street number within the recognized street. The above method further comprises processing the item to be automatically distributed for delivery to the recognized destination.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 9B illustrates an exemplary image processing system for automatically recognizing geographical area information provided on an item without an OCR process according to some embodiments.

FIGS. 12A and 12B are a flow diagram of an exemplary method for automatically recognizing geographical area information on an item by running the trained machine learning or deep learning model according to some embodiments.

DETAILED DESCRIPTION

Figure 1:
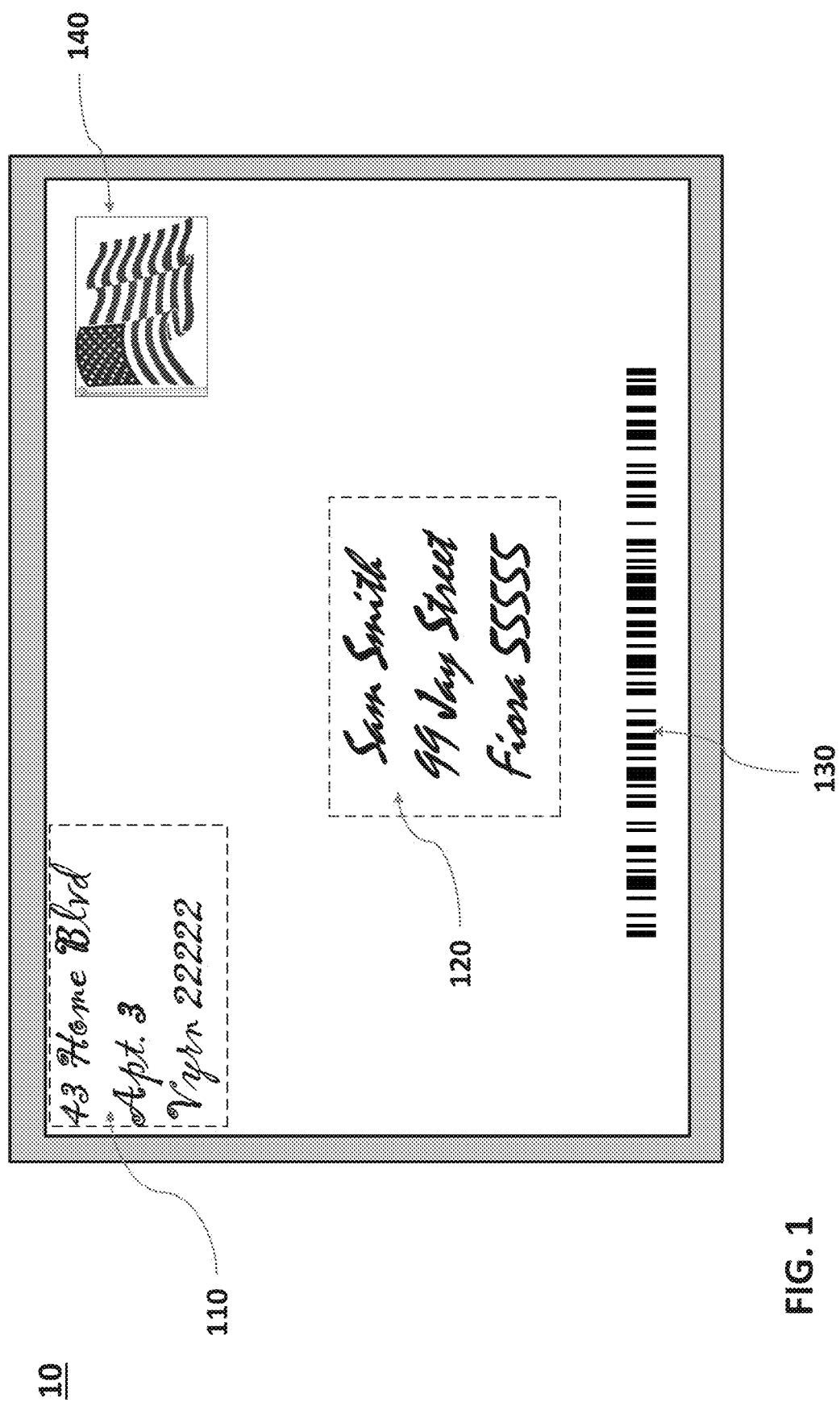
FIG. 1 illustrates an example image of an item that may be processed by the item processing equipment.

Provided herein are various embodiments of systems and methods for image processing including, for example, a system and method for building machine learning or deep learning data sets for automatically recognizing geographical area information (such as addresses) on a mail or parcel item without the use of an optical character recognition (OCR) process. Also provided here are various embodiments of systems and methods for training a machine learning or deep learning model for automatically recognizing geographical area information on an item without OCR. Also provided here are various embodiments of systems and methods for automatically recognizing geographical area information an item without an OCR process. Various embodiments can allow for fully recognizing geographical area information (such as addresses) significantly faster than a typical OCR process so that the functionality of computing devices is significantly improved.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

Where a plurality of images are captured, large volumes of data are created. This can be the case in various applications, such as recording video, photographing items, such as archives, and other applications where multiple images are being captured. A large amount of data is generated when handling items through processing systems. Handling items can include capturing one or more images of the item as it is being processed. For example, items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. Sorting items or articles can be done using imaging technologies. The ability to accurately process a given item may be limited by the effectiveness of the imaging technology to extract accurate information about each item. The information may include personal information about the sender or receiver of the item such as name, address, account information, or other information that is provided in trust that public disclosure will be limited if not avoided altogether. Careful handling of the personal information includes careful handling of images taken of the item during processing. Mail delivery is one example of an industrial application that relies on sorting and processing large quantities of items. Others may include, but are not limited to, retail operations with large inventories and high daily sales, high volume component manufacturers, such as consumer goods, baggage sorting, and importing operations with high volumes of imports needing sorting and receiving daily.

Distribution items such as letters, flats, parcels, containers, inventory, pallets are sorted and the information (e.g., intended destinations, senders, addresses, types of items, barcode, etc.) about them are scanned and processed in a processing facility. The processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, image, or otherwise capture, read, and/or interpret an origination point, a sender, an item type, a destination end point and other information from the items being processed.

In some embodiments, the intended destination end point may be printed or written on a label on the item, and may also be encoded in a computer readable code, such as a bar code printed on or affixed to an exterior surface of the item. In some current sorting and processing equipment, the destination end point may be read by taking an image of the item and performing an optical character recognition (OCR) process on the image, and determining the delivery end point from the OCR'd address. However, OCR processes can be time and resource intensive, particularly where sorting equipment is sorting a large volume of items at a high speed. Improving the identification of intended delivery points on distribution items can improve the speed of sorting items and can increase overall distribution network efficiency.

FIG. 1 illustrates an example image 10 of an item that may be processed by the item processing equipment described above. It will be appreciated that in some embodiments, the image 10 may show only a portion of the item, such as a portion of one side of a parcel or a letter. The image 10 may include a sender region 110, a recipient region 120, a barcode 130 and a postage region 140. Although the regions 110-140 are disposed on particular places in FIG. 1, there are merely example locations and they can be disposed in other places. Furthermore, although four regions 110-140 are shown on the image 10, the image 10 may include more than or less than four regions depending on the embodiment. moreover, although the four regions are separated from each other, two or more of the regions 110-140 may be combined into a single region. For example, the sender region 110 and the recipient region 120 may be combined into a single section. As another example, the sender region 110, the recipient region 120 and the postage region 140 may be combined into a single section. As another example, the sender region 110, the recipient region 120 and the barcode region 130 may be combined into a single section.

Each of the sender region 110 and the recipient region 120 may include a sender or recipient name, and an address portion. The address portion (hereinafter to be interchangeably used with "geographical area information") may be positioned below or above the sender or recipient name. The address portion or geographical area information may include a plurality of geographical area components.

The geographical area components may include a largest geographical area component, at least one intermediate geographical area component, a smallest geographical area component, a smallest geographical area number component, and a postal code. The largest geographical area component may include a state, a province, a country, an area code, or other political or commercial area division, or any desired other geographic boundary or area. The smallest geographical area component may include a street name, a house, a business, a facility, or any other desired area. In some embodiments, the smallest geographical area number component may be a street number, a box number, or other specific location identifier. The at least one intermediate geographical area component may be larger in size than the smallest geographical area component and smaller in size than the largest geographical area component or another intermediate geographical area component if there is more than one intermediate geographical area component. The intermediate geographical area component may include a city, a ZIP code, or other desired area.

In some embodiments, the address portion may be arranged in the order of the largest geographical area component, the at least one intermediate geographical area component, the smallest geographical area component, the smallest geographical area number component, and the postal code. In other embodiments, the address portion may be arranged in the order of the smallest geographical area number component, the smallest geographical area component, the at least one intermediate geographical area component, the largest geographical area component, and the postal code. The above arrangements are merely example, the components of the address portion may be arranged differently.

Currently, on item processing equipment, a captured image of an item undergoes OCR processing. OCR is the electronic or mechanical conversion of images of typed, handwritten or printed text or computer readable codes into machine-encoded text, whether from a scanned document, a photo of a document, a scene-photo (for example, the text on signs and billboards in a landscape photo) or from subtitle text superimposed on an image (for example, from a television broadcast). This OCR processing takes time, particularly, when processing thousands and millions of captured images. This process for OCR'ing an image to interpret a destination end point or delivery point therefrom can take on the order of 100 ms, which can be slow and inefficient when a large number of items are to be processed.

Various embodiments provide systems and methods for using machine learning or deep learning data sets for automatically recognizing geographical area information, such as delivery point information, on an item without using an OCR process. Some embodiments relate to building or training a machine learning or deep learning model. In systems and processes described herein, identifying destination end points on sorting equipment using machine learning and artificial intelligence can take on the order of 2 ms, nearly two orders of magnitude less than OCR processes. The processes described herein can have significant advantages, result in time savings, and greatly improve the processing of items in a distribution network.

A distribution network can train a machine learning, deep learning, or AI model to recognize delivery endpoints by utilizing an existing store of images of distribution items and the OCR information from these items. In the example of the United States Postal Service (USPS), the USPS processes hundreds of millions of items, and has billions of scan events a year. Distribution items can include flats, parcels, letters, magazines, cartons, containers, envelopes, and the like. Using current systems, the USPS has taken images of millions of distribution items, and the OCR information has been used to categorize images and items. A distribution network, such as the USPS can generate a database, repository or vast store of images of addresses or delivery points on items, taken on item processing equipment, which have undergone OCR, and from which various geographic components have been identified. For instance, the OCR information of an item can include an identification of a state, city, street, street number, ZIP code, etc., from the OCR'd images. The state, city, street, etc., information can be stored in metadata in the image, or can be associated with the image via a database pointer or other similar feature. The USPS can also draw bounding boxes on images of items, addresses, of labels on items, etc., indicating where the particular geographic information exists in the image. These systems and processes can be described with regard to FIGS. 2-4.

Figure 2:
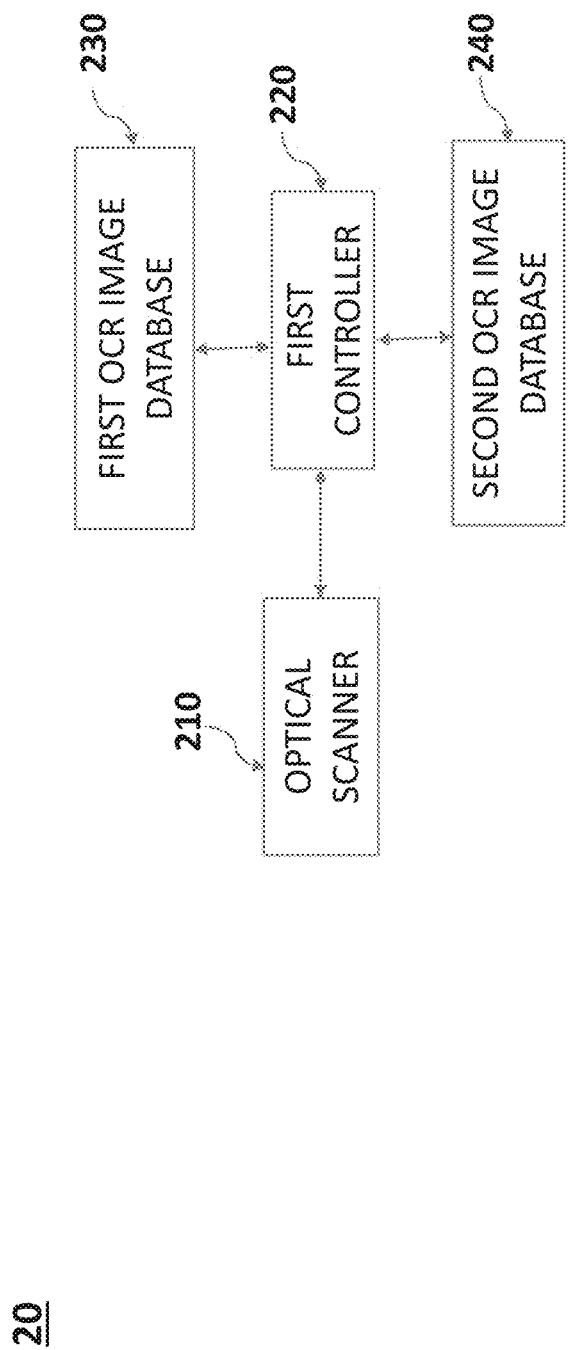
FIG. 2 illustrates an example data building system for building data sets to train a machine learning or deep learning model for automatically recognizing geographical area information provided on an item according to some embodiments.

FIG. 2 illustrates an example data building system 20 for building data sets to train a machine learning or deep learning model for automatically recognizing geographical area information provided on an item without OCR according to some embodiments. FIG. 2 is merely an example data building system, and certain elements may be modified or removed, and/or other elements or equipment may be added. The system 20 may build data sets to train a machine learning or deep learning model for automatically recognizing geographical area information provided on an item without an OCR process.

The system 20 may include an optical scanner 210 (hereinafter to be interchangeably used with "optical sensor," "camera" or "reader"), a first controller 220, a first OCR image database 230, and a second OCR image database 240. In some embodiments, the optical scanner 210 may capture geographical area information (e.g., image 10 in FIG. 1) provided on an item and output an OCR image. The optical scanner 210 may send the OCR image of the captured geographical area information to the first controller 220. In other embodiments, the optical scanner 210 may capture an image of an item containing geographical area information (e.g., image 10 in FIG. 1) provided on an item and output an OCR image of the item. In these embodiments, the optical scanner 210 may send the OCR image of the captured item to the first controller 220 so that the first controller 220 may retrieve the geographical area information from the OCR image of the captured item.

The first OCR image database 230 may store non-classified or non-grouped OCR images of geographical area information (e.g., image 10 in FIG. 1) provided on an item. The non-classified OCR images may include OCR images of geographical area information that have not been classified or grouped into smaller areas. In some embodiments where the geographical area information includes a U.S. style address, each of the non-grouped OCR images may contain a full address including, for example, a country, a state, a city, a street name (or street), a street number, and a postal code. The first OCR image database 230 may be implemented with an existing OCR image DB that stores many (e.g., thousands, millions, or billions) previously captured and processed OCR images of geographical area information. The OCR images can have bounding boxes drawn on the images, with the bounding boxes identifying various items of geographical information. For example the OCR images can have a bounding box drawn around the portion of the image which identifies a state, with an indicator that the box identifies a state. The OCR images can have additional bounding boxes thereon which indicate cities, streets, ZIP codes, or any other desired geographic information. These bounding boxes can be used for classification into the second OCR image database 240.

Figure 3:
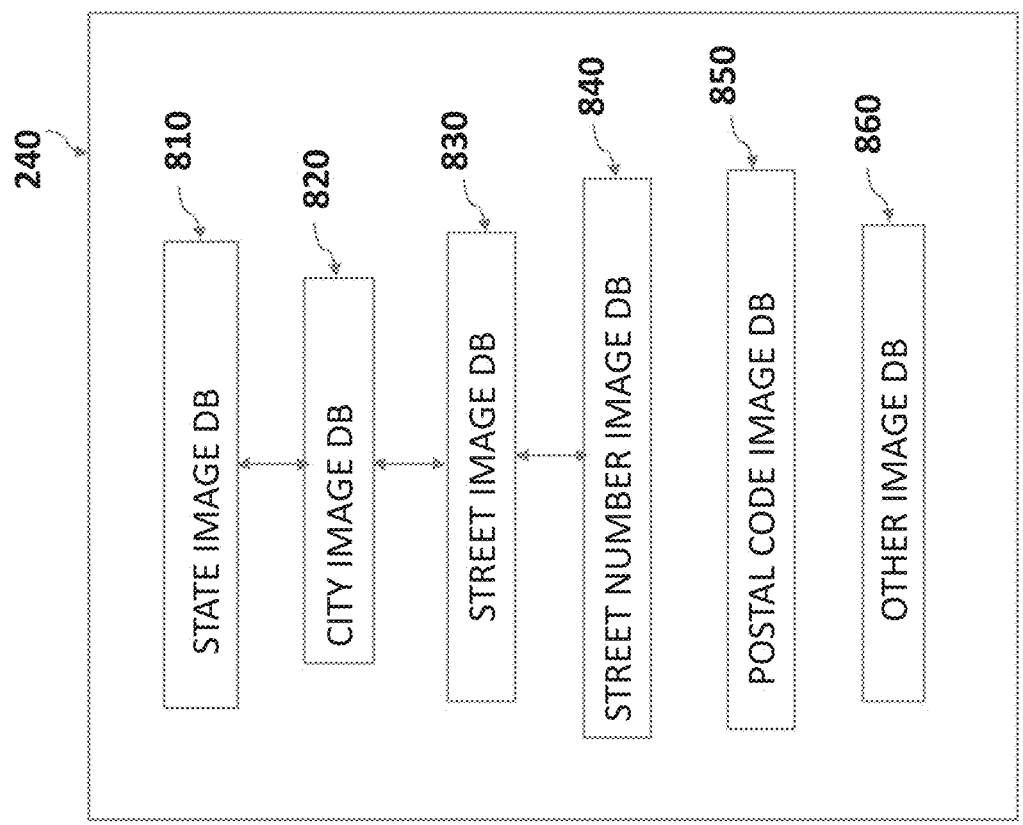
FIG. 3 is an example block diagram of the database for storing data sets built by the data building system shown in FIG. 2 according to some embodiments.
Figure 4:
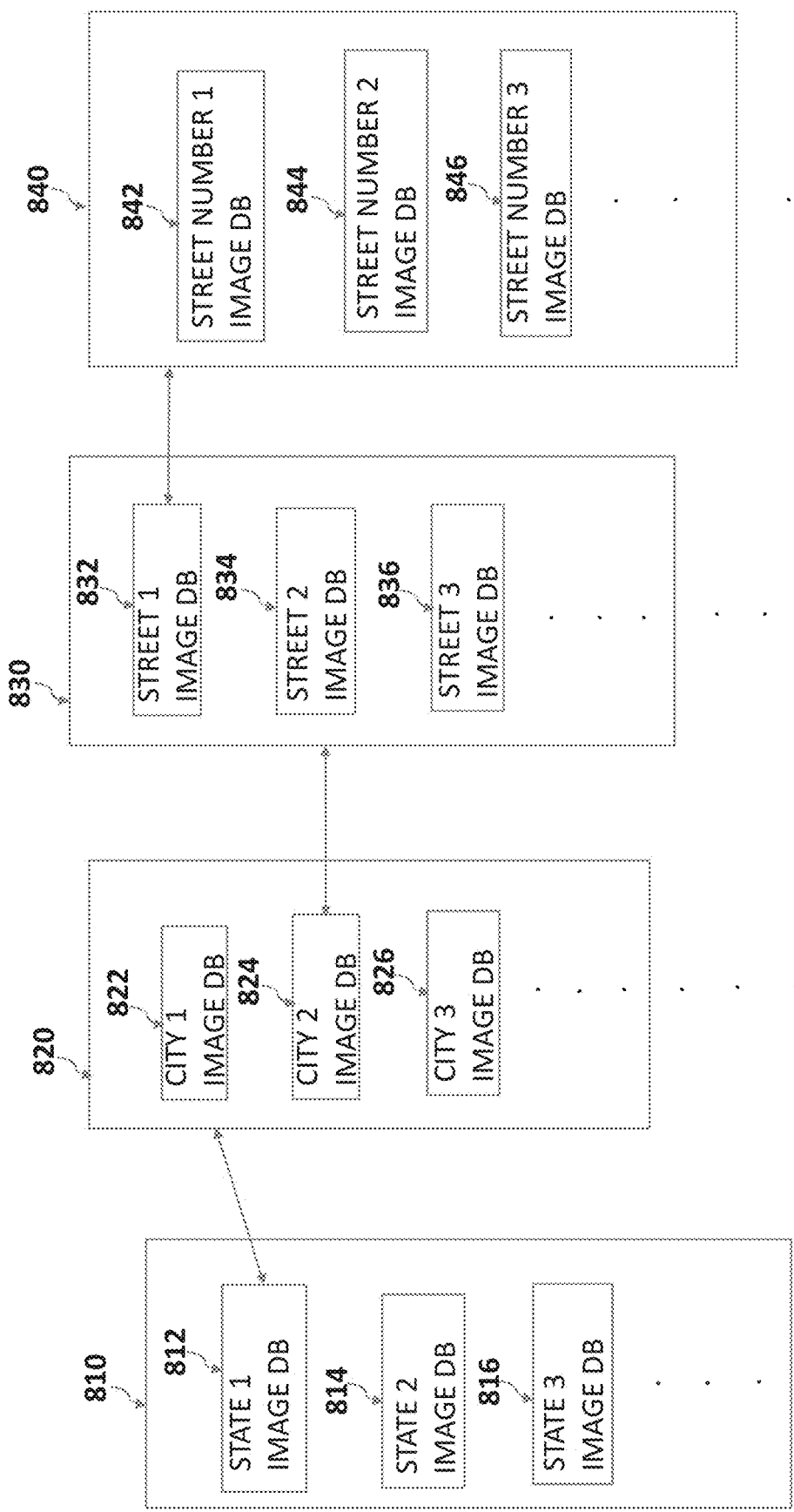
FIG. 4 is an example block diagram of sub-DBs of the database shown in FIG. 3 according to some embodiments.

The second OCR image database 240 may store classified or grouped OCR images of geographical area information provided on an item. The grouped OCR images may include OCR images of a plurality of geographical area components of the geographical area information that have been broken into smaller areas. For example, the entire address may be broken into smaller groups, including, but not limited to, a state, a city, a street name, a street number, a postal code, etc. Each of the smaller groups may have its own DB. An example of the second OCR image database 240 is shown in FIG. 3. OCR image DBs of geographical area components may have a hierarchical structure as shown in FIGS. 3 and 4.

The first controller 220 may communicate data with the optical scanner 210, the first OCR image database 230 and the second OCR image database 240. The first controller 220 may convert non-grouped OCR images of geographical area information into grouped OCR images. For example, the first controller 220 may convert non-grouped OCR images of geographical area information received from the optical scanner 210 into grouped OCR images and save them in the second OCR image database 240. The first controller 220 may also convert non-grouped OCR images of geographical area information received from the first OCR image database 230 into grouped OCR images and save them in the second OCR image database 240. In some embodiments, in converting the non-grouped OCR images into the grouped OCR images, the first controller 220 may extract OCR images of different geographical area components and save the extracted OCR images on portions or sub-databases of the second OCR image database respectively corresponding to the different geographical area components.

Figure 6:
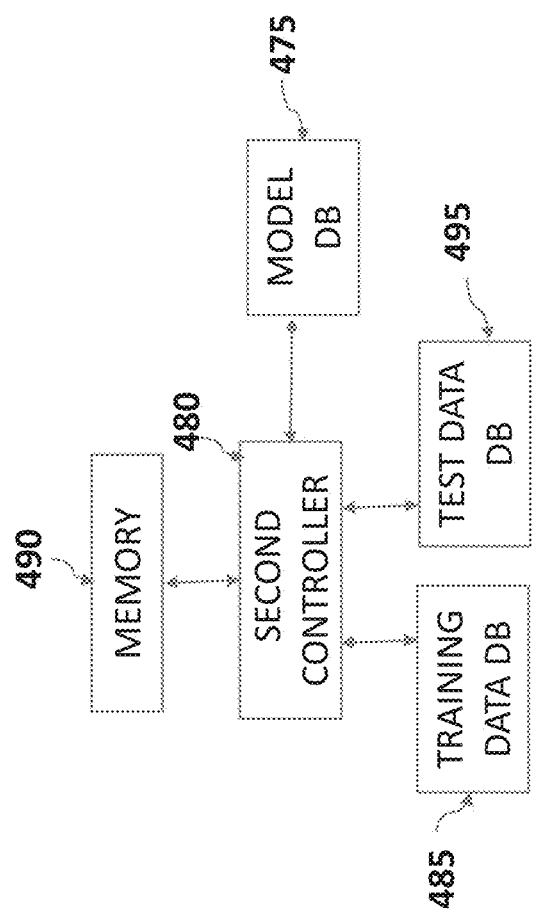
FIG. 6 illustrates an example image processing system for training a machine learning or deep learning model for automatically recognizing geographical area information provided on an item without an OCR process according to some embodiments.
Figure 7:
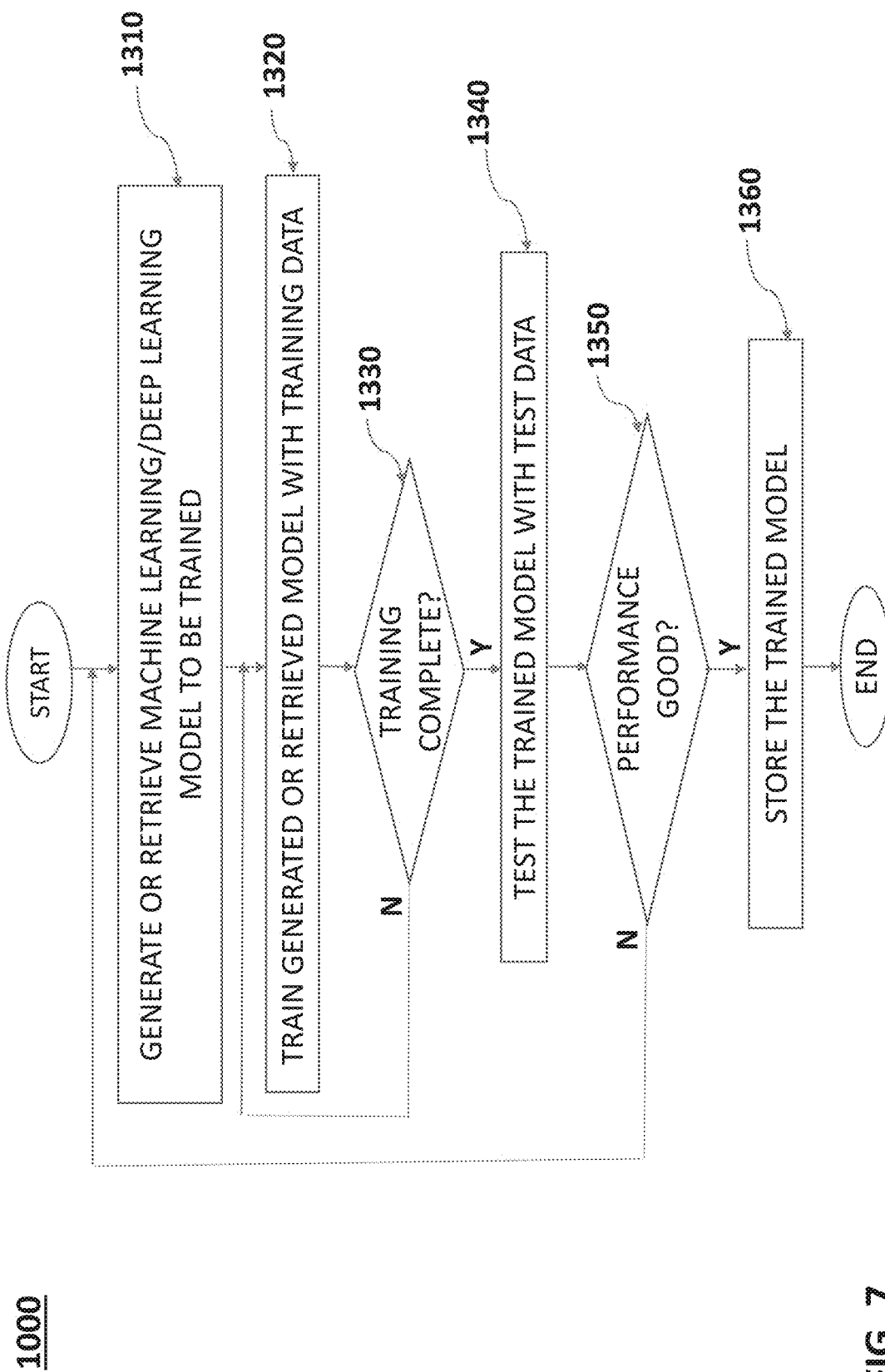
FIG. 7 is a flow diagram of an exemplary method for training a machine learning or deep learning model for automatically recognizing geographical area information provided on an item without an OCR process according to some embodiments.
Figure 8:
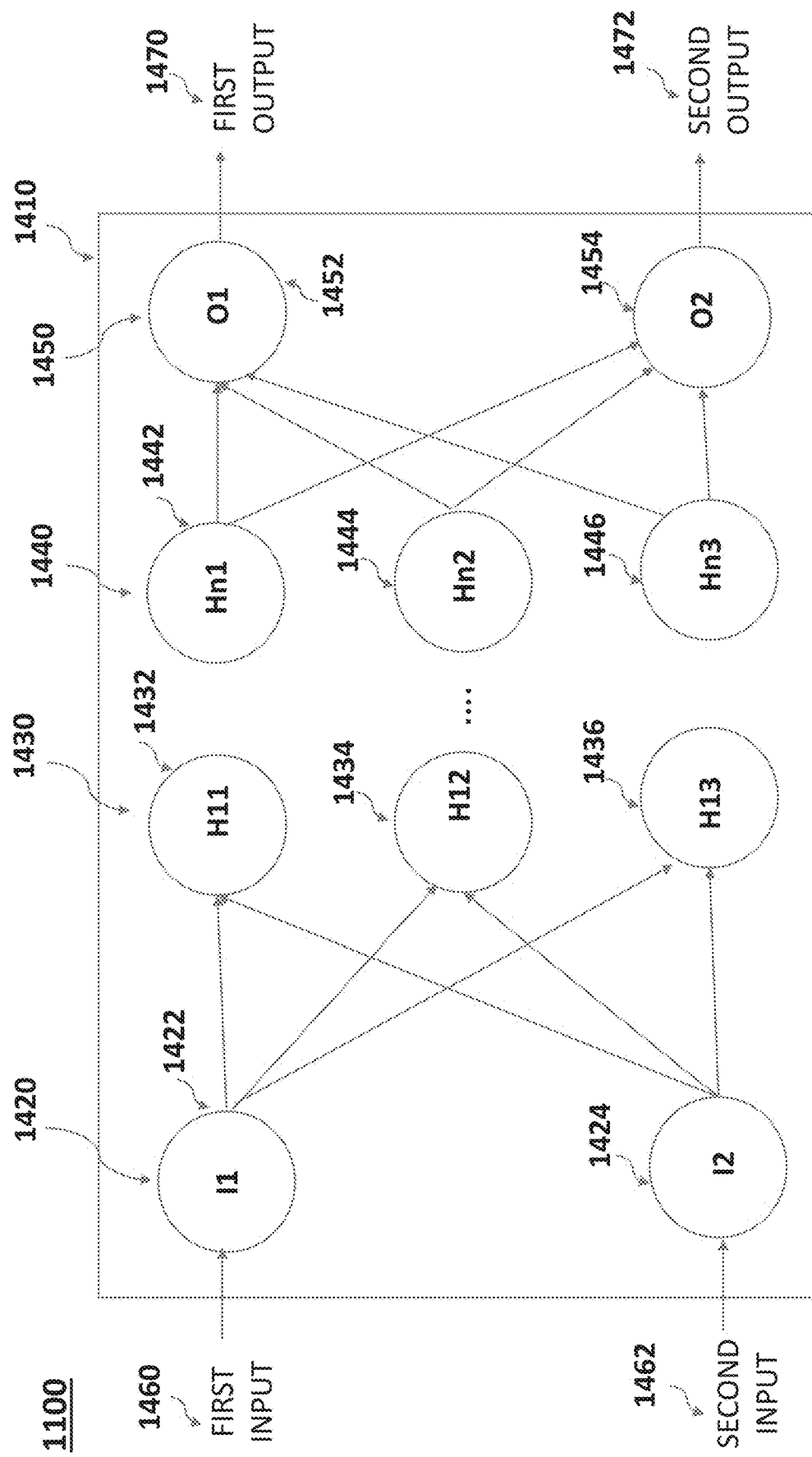
FIG. 8 is a node diagram illustrating an example neural network for performing the machine learning or deep learning operation of FIG. 7.

Although the system 20 has been described as a data building system, the system 20 may also recognize geographical area information such as an address on an item without the use of an OCR process by running a trained machine learning or deep learning model (to be described in greater detail with respect to FIGS. 6-8). In these embodiments, the optical scanner 210 may not perform an OCR process on a captured image, and merely output a captured (non-OCR processed) image.

FIG. 3 is an example block diagram of the second OCR image database 240 shown in FIG. 2 according to some embodiments. The second OCR image database 240 shown in FIG. 3 is merely an example OCR image database, and certain elements may be modified or removed, and/or other elements or equipment may be added. For the purpose of convenience, the description will be provided based on a U.S. style address. However, addresses in other styles or for other countries can also be used.

The second OCR image database 240 may include a state image DB 810, a city image DB 820, a street image DB 830, a street number image DB 840, a postal code OCR image DB 850, and other OCR image DB 860.

The state image DB 810 may store a plurality of previously OCR processed images of states. For example, the previously OCR processed state images may include images of words of different "states" which were handwritten, typed or printed by a user, for example, a sender of the item. The words "states" may be full state names or their acronyms (e.g., "California" or "CA", "Arizona" or "AZ", etc.). The states may include 50 states of the U.S. and other equivalent U.S. territories described above. In some embodiments, the DB 810 (or any of the other DBs described herein) can store in metadata of the image the state (or city, street, etc.) identifier, or can include a pointer which identifies the particular state (or city, street, etc.) depicted in the image of the item. In some embodiments, the images need not be OCR images, but can be images which have an identifier for the state or other geographic region identified and stored/associated with the image.

The city image DB 820 may store a plurality of previously OCR processed images of cities. For example, the previously OCR processed city images may include images of words of different "cities" handwritten, typed or printed by a user. The words "cities" may be full state names or their acronyms (e.g., "Los Angeles" or "LA", "San Francisco" or "SF", etc.). In some embodiments, the city image DB 820 may include a plurality of sub-city image DBs each of which stores OCR images of all of the cities that belong to their state. The number of the sub-city image DBs may be the same as the number of the states.

The street image DB 830 may store a plurality of previously OCR processed images of streets. For example, the previously OCR processed street images may include images of words of different "streets" handwritten, typed or printed by a user. The words "street" or parts or types thereof may be full street names or their acronyms (e.g., "Fourth Avenue" or "4$^{th}$ Ave.", "Gilman Street" or "Gilman St.", etc.). In some embodiments, the street image DB 830 may include a plurality of sub-street image DBs each of which stores OCR images of all of the streets that belong to their city. The number of the sub-street image DBs may be the same as the number of all of the constituent cities of each state.

The street number image DB 840 may store a plurality of previously OCR processed images of street numbers. For example, the previously OCR processed street number images may include images of different "street numbers" handwritten, typed or printed by a user. In some embodiments, the street number image DB 840 may include a plurality of sub-street number image DBs each of which stores OCR images of all of the street numbers that belong to their street. The number of the sub-street number image DBs may be the same as the number of all of the constituent streets of each city.

The postal code OCR image DB 850 may store a plurality of previously OCR processed images of postal codes. The other OCR image DB 860 may store other previously OCR processed images of other information such as labels, postages, sender or receiver names, barcodes, etc., provided on a parcel or mail item.

FIG. 4 is an example block diagram of the state image DB 810, the city image DB 820, the street image DB 830 and the street number image DB 840 shown in FIG. 3 according to some embodiments. The DB block diagram shown in FIG. 4 is merely an example DB, and certain elements may be modified or removed, and/or other elements or equipment may be added. For example, the DB block diagram may additionally include the postal code OCR image DB 850 shown in FIG. 3.

The state image DB 810 may include a plurality of state image DBs, including, but not limited to, state 1 image DB 812, state 2 image DB 814 and state 3 image DB 816. For the purpose of convenience, only three state image DBs are shown. However, the state image DB 810 may include OCR image DBs as many as the number of the states and equivalent U.S. territories described above. Each of the state image DBs may store OCR-processed images of scanned state images for the corresponding state.

As described above, "state" names may be handwritten, typed or printed. Furthermore, the state image can be generated in many different capturing positions and environments. For example, the optical scanner 210 may capture an item having the geographical area information thereon in different positions (e.g., distances, angles between a lens of the optical scanner and the item, orientations of the item with respect to the lens of the optical scanner, etc.). Furthermore, the optical scanner 210 may capture an item having the geographical area information thereon in different capturing environments (e.g., optical scanner shutter speeds, intensity, color, white balance, lightings, shadings and/or contrasts, lighting conditions, etc.). This may apply to the city image DB 820, the street image DB 830 and the street number image DB 840. These stored OCR images may be used to train a machine learning or deep learning model for recognizing a state, a city, a street, and a street number, etc. Each of the state image DBs 812-816 may communicate data with a plurality of city OCR image databases respectively storing city OCR images of all constituent cities of each state.

The city image DB 820 may include a plurality of city image DBs, including, but not limited to, city 1 OCR image DB 822, city 2 image DB 824 and city 3 OCR image DB 826. For the purpose of convenience, only the city image DBs for the state 1 image DB 812 are shown, and city image DBs for the other state image DBs are omitted. Furthermore, for the purpose of convenience, only three city image DBs 822-826 associated with the state 1 image DB 812 are shown, and the remaining city image DBs for the same state 1 image DB 812 are omitted. The city image DB 820 may include city image DBs as many as the number of all of the constituent cities, villages, townships, etc. of state 1. Each of the city image DBs 822-826 may communicate data with a plurality of street image DBs respectively storing street OCR images of all constituent streets of each city. Each of the city image DBs may store OCR-processed images of words of cities handwritten, typed and/or printed.

The street image DB 830 may include a plurality of street image DBs, including, but not limited to, street 1 image DB 832, street 2 image DB 834 and street 3 image DB 836. For the purpose of convenience, only the street image DBs for the city 2 image DB 824 are shown, and street image DBs for the other city image DBs are omitted. Furthermore, for the purpose of convenience, only three street image DBs 832-836 for the city 2 image DB 824 are shown, and the remaining city image DBs for the same city 2 image DB 824 are omitted. The street image DB 830 may include street image DBs as many as the number of all of the constituent streets of the city 2. Each of the street image DBs may store OCR-processed images of words of streets handwritten, typed and/or printed.

The street number image DB 840 may include a plurality of street number image DBs, including, but not limited to, street number 1 image DB 842, street number 2 image DB 844 and street number 3 image DB 846. For the purpose of convenience, only street number image DBs for the street 1 image DB 832 are shown, and street number image DBs for the other street image DBs are omitted. Furthermore, for the purpose of convenience, only three street number image DBs 842-846 for the street 1 image DB 832 are shown, and the remaining street number image DBs for the same the street 1 image DB 832 are omitted. The street number image DB 840 may include street number image DBs as many as the number of the street numbers that belong to the street 1. Each of the street number image DBs may store images of scanned street number images. Each of the street image databases is configured to communicate data with a plurality of street number image databases configured to respectively store street number OCR images of all constituent street numbers of each street. Each of the street number image DBs may store images of street numbers handwritten, typed and/or printed.

Figure 5:
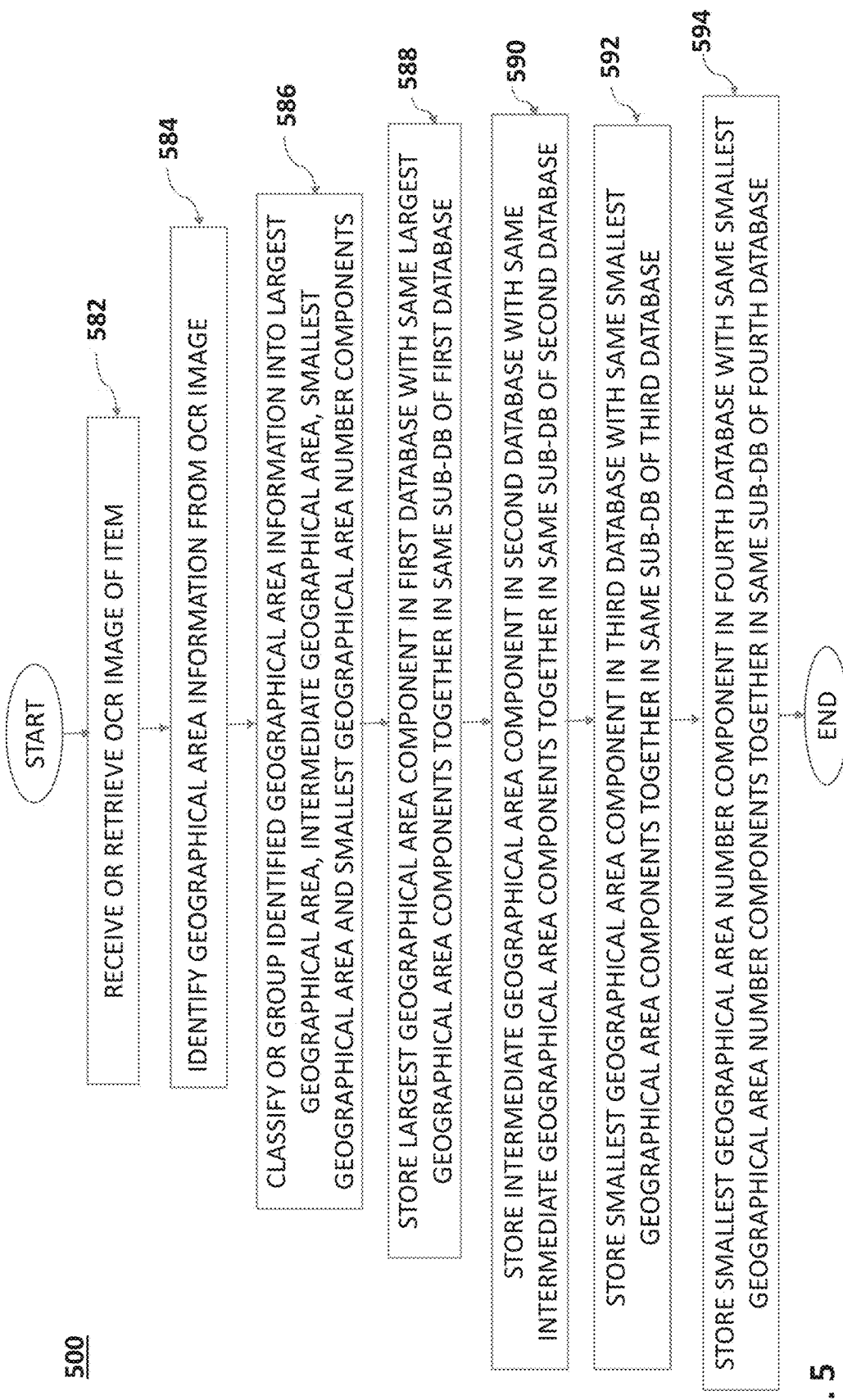
FIG. 5 is a flow diagram of an exemplary method for building data sets to train a machine learning or deep learning model for automatically recognizing geographical area information provided on an item according to some embodiments.

FIG. 5 is a flow diagram 500 of an exemplary method for building data sets to train a machine learning or deep learning model for automatically recognizing geographical area information provided on an item according to some embodiments. Although the flow diagram 500 is described herein with reference to a particular order, in various embodiments, states herein may be performed in a different order, or omitted, and additional states may be added. This may apply to the processes 1000, 600 and 1200 shown in FIGS. 7, 10, 12A and 12B. The diagram 500 may be performed by a computing device such as the first controller 220 shown in FIG. 2. For the purpose of convenience, the description will be provided based on the first controller 220 performing the flow diagram 500.

In state 582, the first controller 220 may receive or retrieve an OCR image of an item. For example, the first controller 220 may receive the image from the optical scanner 210 or from the first OCR image database 230. In some embodiments, the image from the optical scanner 210 may have been subjected to an OCR process in order to recognize or interpret writing, letters, words, numbers, etc., thereon, such as a delivery point, return address, etc.

In state 584, the first controller 220 may identify or extract information from the received or retrieved image of the item. This may occur by performing an OCR process on the received or retrieved image, or may be done by obtaining the image and reading metadata thereof which includes delivery point information, or by reading delivery point information associated with the image. In some embodiments, the first controller 220 can identify one or more bounding boxes on the image and the geographic area information associated with the one or more bounding boxes. As described above, the geographical area information may be a full address, for example, including a country, a state, a city, a street, a street number, and a postal code.

In state 586, the first controller 220 may classify or group an image having an identified geographical area information into an image of a largest geographical area component, an image of an intermediate geographical area component, an image of a smallest geographical area component and an image of a smallest geographical area number component. When the geographical area information is a full address, the largest geographical area component may be a state, a province, or country, the intermediate geographical area component may be a city (or a province), the smallest geographical area component may be a street, and the smallest geographical area number component may be a street number.

In state 588, the first controller 220 may store images of the largest geographical area component in a first database with images of the same largest geographical area components in the same sub-DB of the first database. For example, when the largest geographical area component is a state, the first database may be the state image DB 810, and the sub-DBs may include the different state image DBs such as the state 1 image DB 812, the state 2 image DB 814, the state 3 OCR image DB 816, etc., shown in FIG. 4.

As one example, when the largest geographical area component is state 1 (e.g., Alabama), the first controller 220 may store state 1 (Alabama) images in the state 1 image DB 812 of the state image DB 810. As another example, when the largest geographical area component is state 2 (e.g., Alaska), the first controller 220 may store state 2 (Alaska) OCR images in the state 2 image DB 814 of the state image DB 810. All the images for the same state may be stored in the same state image DB. For example, all the images for state 1 may be stored in the state 1 image DB 812. Furthermore, all the images for state 2 may be stored in the state 2 image DB 814. Moreover, all the images for state 3 may be stored in the state 3 image DB 816.

In state 590, the first controller 220 may store images of the intermediate geographical area component in a second database with OCR images of the same intermediate geographical area components together in the same sub-DB of the second database. For example, when the intermediate geographical area component is a city, the second database may be the city image DB 820, and the sub-DBs may include the different city image DBs such as the city 1 image DB 822, the city 2 image DB 824, the city 3 image DB 826, etc., shown in FIG. 4.

As one example, when the largest geographical area component is state 1 and the intermediate geographical area component is city 1 of state 1, the first controller 220 may store city 1 images in the city 1 image DB 822 of the city image DB 820. As another example, when the intermediate geographical area component is city 2 of state 1, the first controller 220 may store city 2 images in the city 2 image DB 824 of the city image DB 820. All the images for the same city may be stored in the same city image DB. For example, all the images for city 1 may be stored in the city 1 image DB 822. Furthermore, all the images for city 2 may be stored in the city 2 image DB 824. Moreover, all the images for city 3 may be stored in the city 3 image DB 826. Although the city is described as one example of the intermediate geographical area component, there may be more than one intermediate geographical area component, for example, province.

In state 592, the first controller 220 may store images of the smallest geographical area components in a third database with images of the same smallest geographical area components together in the same sub-DB of the third database. For example, when the smallest geographical area component is a street, the third database may be the street image DB 830, and the sub-DBs may include the different street image DBs such as the street 1 image DB 832, the street 2 image DB 834, the street 3 image DB 836, etc., shown in FIG. 4.

As one example, when the largest geographical area component is state 1, the intermediate geographical area component is city 1 of state 1, and the smallest geographical area component is street 1 of city 1 of state 1, the first controller 220 may store street 1 images in the street 1 image DB 832 of the street image DB 830. As another example, when the smallest geographical area component is street 2 of city 1, the first controller 220 may store street 2 images in the street 2 image DB 834 of the street image DB 830. All the images for the same street may be stored in the same street image DB. For example, all the images for street 1 may be stored in the street 1 image DB 832. Furthermore, all the images for street 2 may be stored in the street 2 image DB 834. Moreover, all the images for street 3 may be stored in the street 3 image DB 836.

In state 594, the first controller 220 may store images of the smallest geographical area number component in a fourth database with images of the same smallest geographical area number components together in the same sub-DB of the fourth database. For example, when the smallest geographical area number component is a street number, the fourth database may be the street number image DB 840, and the sub-DBs may include the different street number image DBs such as the street number 1 image DB 842, the street number 2 image DB 844, the street number 3 image DB 846, etc., shown in FIG. 4.

As one example, when the largest geographical area component is state 1, the intermediate geographical area component is city 1 of state 1, the smallest geographical area component is street 1 of city 1, and the smallest geographical area number component is street number 1 of street 1, the first controller 220 may store street number 1 images in the street number 1 image DB 842 of the street number image DB 840. As another example, when the smallest geographical area number component is street number 2 of city 1, the first controller 220 may store street number 2 images in the street number 2 image DB 844 of the street image DB 840. All the images for the same street number may be stored in the same street number image DB. For example, all the images for street number 1 may be stored in the street number 1 image DB 842. Furthermore, all the images for street number 2 may be stored in the street number 2 image DB 844. Moreover, all the images for street number 3 may be stored in the street number 3 image DB 846.

FIG. 6 illustrates an example image processing system 30 for training a machine learning or deep learning model for automatically recognizing geographical area information provided on an item without an process according to some embodiments. The image processing system 30 shown in FIG. 6 is merely an example image processing system, and certain elements may be modified or removed, and/or other elements or equipment may be added. The image processing system 30 may include a model DB 475, a training data DB 485, a test data DB 495, a second controller 480 and a memory 490.

The image processing system 30 may train one or more machine learning/deep learning models stored on the model DB 475 or the memory 490 using training data sets stored in the training data DB 584 and test data sets stored in the test data DB 495. The trained models may be used to automatically recognize geographical area information provided on an item without an OCR process.

The second controller 480 may communicate data with the model DB 475, the training data DB 485, the test data DB 495 and the memory 490. In some embodiments, at least one of the model DB 475, the training data DB 485 or the test data DB 495 may be built using the second OCR image database 240 shown in FIG. 2. The second controller 480 may train a machine learning/deep learning model with training data sets stored in the training data DB 485 to automatically recognize geographical area information provided on an item without an OCR process.

In some embodiments, the second controller 480 may generate an initial machine learning/deep learning model from existing machine learning/deep learning models relating to computer vision or image recognition. In other embodiments, the second controller 480 may generate from scratch an initial machine learning/deep learning model relating to computer vision or image recognition. The second controller 480 may generate the initial model using machine learning model building language and its libraries. The machine learning model building language may include, but is not limited to, Python, Java, R, C++, C, JavaScript, Scala or *Julia*. The second controller 480 may train the generated initial model with the training data sets stored in the training data DB 485 and test the trained model with the test data sets stored in the test data DB 495. The second controller 480 may store the trained and tested model in at least one of the memory 490 or the model DB 475. The second controller 480 may also store the "trained and tested" model (to be interchangeably used with "trained" model) therein.

The model DB 475 may store one or more trained models to be used to recognize geographical area information provided on an item without an OCR process. The trained models may be stored in a trained model section of the model DB 475. The model DB 475 may also store one or more non-trained models in a non-trained model section of the model DB 475. At least one of the non-trained models may be trained by the second controller 480 to be used to automatically recognize geographical area information provided on an item without an OCR process, and the trained model may be stored in the model DB 475. In some embodiments, the model DB 475 may store only non-trained models and the trained models may be stored in the memory 490 and/or the second controller 480. In these embodiments, the second controller 480 may directly run the trained model(s) to recognize geographical area information provided on an item without accessing the model DB 475 or the memory 490. In some embodiments, the trained models may be used to identify one or more of geographical area components of geographical area information provided on an item, such as a state, a city, a street, and a street number, etc.

The training data DB 485 may store a plurality of sets of training data used to train one or more of initially non-trained models. The training data sets may include previously captured or retrieved OCR images of items (containing geographical area information) or OCR images of geographical area components that are generally different from those images used to create the trained models. The training data sets may be generated by the first controller 220 shown in FIG. 2. The number of the training data sets may depend on the embodiments. For example, several thousand images may be used for training a machine learning or deep learning model for relatively simple geographical area information protocols. Furthermore, several million or more images may be used for training the machine learning or deep learning model for relatively complicated geographical area information protocols.

The test data DB 495 may store a plurality of sets of test data used to test an identified and trained model. The test data set may include previously captured or retrieved images of items (including geographical area information) or images of geographical area components that are generally different from those images used to train the identified models and those used to create the trained models. Datasets for training machine learning model can include a large number of images of geographical area information of interest, for example, images of states, images of cities, images of streets, and images of street numbers, images of postal codes, etc., as shown in FIGS. 3 and 4, which include an identifier of the state, city, street, etc., shown in the images. To generate the large number of images, an automated system can automatically generate a large number of images depicting known geographical area information, such as delivery point information. The images can then be used to train the machine learning algorithm. This test data may be generated by the first controller 220 shown in FIG. 2. Again, fewer numbers of test data sets may be used for testing a trained machine learning or deep learning model for relatively simple geographical area information protocols and more numbers of test data sets may be used for testing a trained machine learning or deep learning model for relatively complicated geographical area information protocols.

FIG. 7 is a flow diagram 1000 of a method for training a machine learning or deep learning model for automatically recognizing geographical area information on an item without the use of an OCR process according to some embodiments. The flow diagram 1000 may be implemented by a computing device such as the second controller 480 shown in FIG. 6. FIG. 7 is merely an example flow diagram for training a machine learning or deep learning model, and certain states elements may be removed, other states added, two or more states combined or one state can be separated into multiple states depending on the specification and requirements. FIG. 8 is a node diagram 1100 illustrating an example neural network for performing the machine learning or deep learning operation of FIG. 7. The node diagram 1100 may be implemented by a computing device such as the second controller 480. For the purpose of the convenience, the description will be made based on the second controller 480 shown in FIG. 6 performing the flow diagram 1000 of FIG. 7 and the node diagram 1100 of FIG. 8.

In state 1310, the second controller 480 may generate or retrieve a machine learning or deep learning model to be trained. As described above, the second controller 480 may generate the machine learning or deep learning model relating to image recognition from scratch or from an existing relevant model. The second controller 480 may also retrieve the machine learning or deep learning model from the model DB 475 or the memory 490. The second controller 480 may store a relevant machine learning or deep learning model to be trained.

In state 1320, the second controller 480 may train the generated or retrieved model with training data sets stored in the training data DB 485. In some embodiments, in training the generated or retrieved model, parameters of the model can be modified until the model produces (or "converges" on) the correct or desired output. For instance, a correct output of an image recognition model may include generating an output that identifies the subject included in the image. This allows the model to evolve by adjusting weight values to affect the output for one or more hidden nodes (see 1420-1450 shown in FIG. 8). The changing of the weight values may be performed through a variety of methods such as random weight updates or backward propagation sometimes referred to as "back propagation." Back propagation includes comparing the expected model output with the obtained model output and then traversing the model to determine the difference between the expected node output that produces the expected model output and the actual node output. An amount of change for one or more of the weight values may be identified using this difference such that the model output more closely matches the expected output.

In some embodiments, the second controller 480 may use a machine learning or deep learning neural network model 1410 shown in FIG. 8 in training the generated or retrieved model. Referring to FIG. 8, the neural network model 1410 includes a plurality of hidden nodes: two nodes 11 (1422) and 12 (1424) at an input layer 1420, three nodes H11 (1432), H12 (1434) and H13 (1436) at a first middle layer 1430, three nodes Hn1 (1442), Hn2 (1444) and Hn3 (1446) at an nth middle layer 1440, and two nodes 1452 (01) and 1454 (02) at an output layer 1450. The neural network model 1410 may be trained on input data such as a first input 1460 and a second input 1462 and provide output data such as a first output 1470 and a second output 1472. In some embodiments, one or more of the inputs 1460 and 1462 may be OCR images of geographical area information including one or more of geographical area components such as a country, a state, a city, a street, a street number, etc., described above, and one or more of the outputs 1470 and 1472 may include recognized geographical area information. Although FIG. 8 shows only two inputs and two outputs, depending on the embodiment, more than or less than two inputs can be used, and/or more than or less than two outputs can be used. In some embodiments, each layer may process over, for example, 100, 1,000, 10,000, 100,000, 1,000,000 or greater parameter values. Furthermore, the model 1410 shown includes n middle layers. However, depending on the embodiment, only one middle layer or more than two layers (e.g., 4, 5, 7, 12, 30 or more layers) can be used. To further emphasize the complexity of the models, the number of nodes at each layer is shown as being two or three in FIG. 8, but can be increased to factors of ten or one hundred in some embodiments. The lines connecting each node are each associated with a weight.

Referring back to FIG. 7, in state 1330, the second controller 480 may determine whether the training process is complete. The determination may be based on the accuracy of the outputs generated by the identified model for a set of inputs. The accuracy of the outputs may be compared to an accuracy threshold or other target accuracy metric. In some embodiments, the completion may be based on resources spent training such as processor time, processor cycles, memory utilization, or other detectable characteristic of the system.

If it is determined in state 1330 that the training process is not complete, the states 1320 and 1330 may repeat, for example, until the training process is complete. If it is determined in state 1330 that the training process is complete, the second controller 480 may test the trained model (state 1340). In some embodiments, the testing may be performed using one or more test data sets stored in the test data DB 495. The test data sets may be different from the training data sets stored in the training data DB 485.

In state 1350, the second controller 480 may determine whether the performance of the tested model is good or sufficient. The determination of the performance may be based on the accuracy of the outputs generated by the identified model for a set of inputs as described above. If it is determined in state 1350 that the performance is not good or sufficient, the states 1310-1350 may repeat, for example, until the performance is sufficient. If it is determined in state 1350 that the performance is good or sufficient, the second controller 480 may store the tested model to be used to recognize geographical area information provided on an item without an OCR process (state 1360). The tested model may be stored in one or more of the model DB 475, the second controller 480 or the memory 490.

In some embodiments, the second controller 480 may use a classification model in performing one or more of the states 1310-1350 of FIG. 7. Generally, a classification model is a supervised learning approach in which a computer program learns from data input given to it and then uses this learning to classify new observation. This data set may simply be bi-class (like identifying whether the person is male or female or that the email is spam or non-spam) or it may be multi-class too. Some examples of classification problems may include speech recognition, handwriting recognition, biometric identification, document classification, etc. Types of classification algorithms may include, but are not limited to, linear classifiers, logistic regression, Naive Bayes classifier, nearest neighbor, support vector machines, decision trees, boosted trees, random forest and neural networks. The classification model may also provide a confidence indicating a confidence that the resulting classification is the "correct" classification. The analysis may also include character recognition.

The process of FIG. 7 can be repeated for each geographical area information required. For example, the process of FIG. 7 can be performed using geographic data, and can result in a model trained to identify and/or recognize states. The process of FIG. 7 can be performed on data for a plurality of cities within each state on which the model has been trained. The process of FIG. 7 can then be run to train models to recognize street names within each of the cities. The training and testing processes can result in a plurality of models each trained to recognize information at different geographic levels.

Figure 9A:
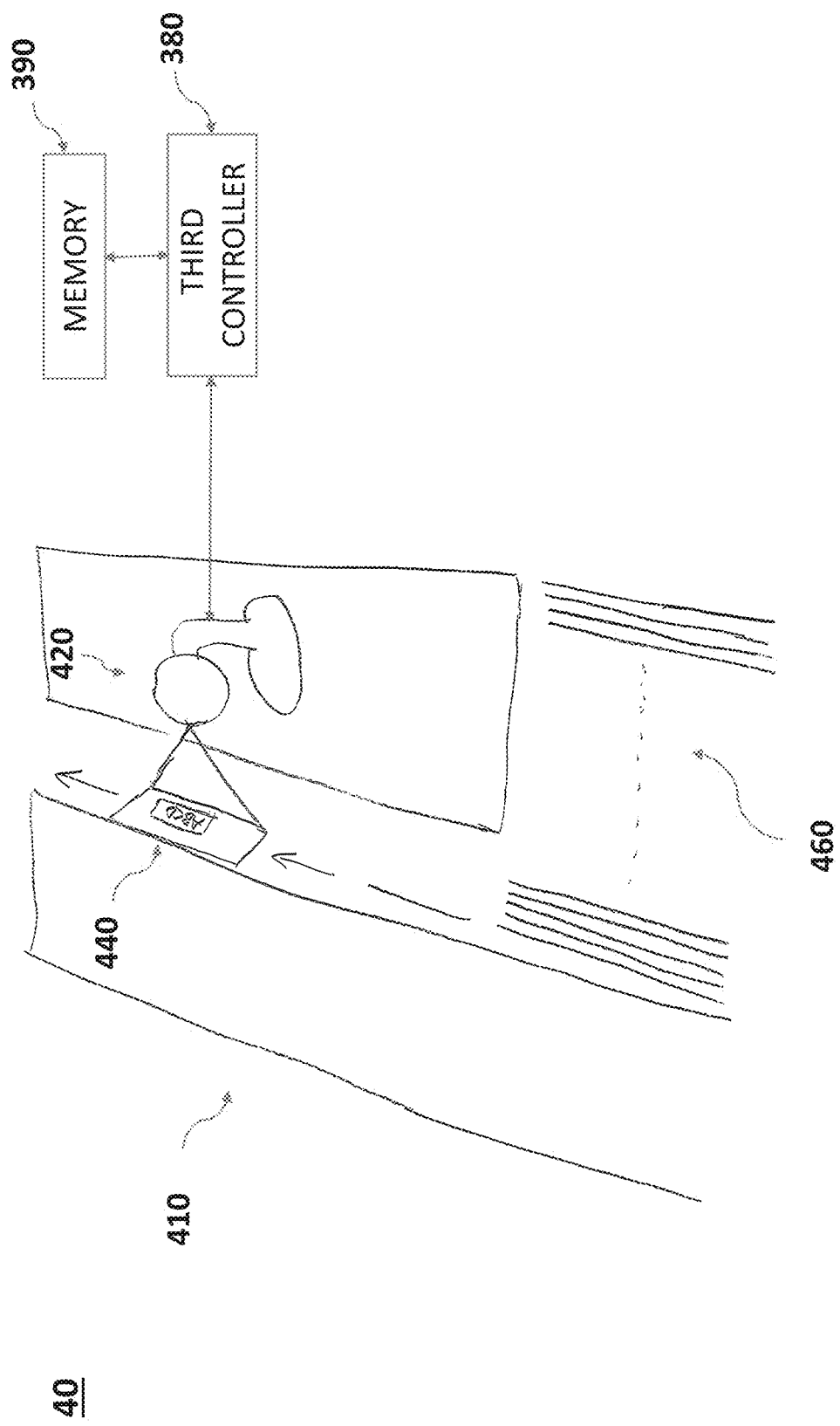
FIG. 9A illustrates an example image processing system for automatically recognizing geographical area information provided on an item without an OCR process according to some embodiments.

FIG. 9A illustrates an example image processing system 40 for automatically recognizing geographical area information provided on an item without an OCR process according to some embodiments. The image processing system 40 may automatically recognize geographical area information provided on an item without an OCR process by running the trained machine learning or deep learning model on captured images containing geographical area information. The image processing system 40 shown in FIG. 9A is merely an example image processing system, and certain elements may be modified or removed, and/or other elements or equipment may be added. Although only one optical scanner is shown in FIG. 9A, two or more optical scanners can be provided depending on the embodiment. Furthermore, although one type of item processing equipment is depicted in FIG. 9A, the current disclosure is not limited thereto. The systems and methods described here can be applicable to the illustrated type and other types of item processing equipment without departing from the scope of the current disclosure.

The image processing system 40 may include an item processing equipment 410, an optical scanner 420, a third controller 380 and a memory 390. Furthermore, although the first controller 220 shown in FIG. 2, the second controller 480 shown in FIG. 6 and the third controller 380 shown in FIG. 9A may respectively perform building data sets, training a machine learning/deep learning model and recognizing geographical area information, any one of the controllers 220, 480 and 380 may perform two or more of the above three functions.

The item processing equipment 410 may include a conveyor belt or other component (not shown) that moves items from one location to another. The item processing equipment 410 may automatically process a group 460 of items by conveying each of them past the optical scanner 420 that captures an image of an item 440 that is being conveyed. The optical scanner 420 may capture an entirety or a portion of one side of the item 440 facing the scanner 420. The optical scanner 420 may also capture geographical area information (such as addresses) provided on (e.g., attached to, printed on or embedded into) an item such as the item 440. As described above, the geographical area information may include, but is not limited to, addresses of senders and recipients. The geographical area information may further include other geographical area information such as town, county, whole country, etc. The optical scanner 420 may also capture non-geographical area information such as names of senders and recipients, postages and barcodes, a special mail region, etc. For the purpose of convenience, the description will be made mainly based on the captured image being geographical area information (such as addresses) provided on an item.

The optical scanner 420 may continuously and separately capture items being transported in front of the scanner 420 to output images of captured geographical area information. In some embodiments, the captured images or digital data thereof may be stored in the memory 390. In other embodiments, the captured images or digital data thereof may be stored in a memory of the scanner 420 or a memory of the third controller 380. In other embodiments, the captured images or digital data thereof may be stored in a network memory such as a cloud or other device separately located from the elements 380 and 390. The optical scanner 420 may be connected to the third controller 380 either by wire or wirelessly.

The memory 390 may include one or more of the databases 810-860 shown in FIGS. 3 and 4. For example, the memory 390 may include a state image database configured to store state images of a plurality of states, a city image database configured to store city images for all constituent cities of each state, a street image database configured to store street images for all constituent streets of each city and a street number image database configured to store street number images for all constituent street numbers of each street. The memory 390 may further include a sub-component list database configured to store a list of all constituent cities of each of the states, a list of all constituent streets of each city and a list of all constituent street numbers of each street (see, for example, FIG. 11).

The third controller 380 may automatically recognize geographical area information provided on an item by running the trained machine learning or deep learning model on images captured by the optical scanner 420 containing geographical area information. The trained model may be stored in the memory 390 or in the third controller 380. The optical scanner 420 may capture items or geographical area information, and output images thereof. The third controller 380 may automatically recognize geographical area information by running the trained machine learning or deep learning model on the images captured by the optical scanner 420.

FIG. 9B illustrates another example image processing system 50 for automatically recognizing geographical area information provided on an item without the use of an OCR process according to some embodiments. The image processing system 50 may include a conveyor 510, an upper optical scanner 540 and a front optical scanner 550. For the purpose of convenience, the third controller 380 in data communication with the scanners 540 and 550 and the memory 390 are not shown in FIG. 9B. The conveyor 510 may transport items 520 and 530 via a conveyor belt 515. For the purpose of convenience, only two items 520 and 530 are shown in FIG. 9B, however, the scanners 540 and 550 may continuously scan many more items (not shown) that are being transported on the conveyor belt 515. The upper scanner 540 may be spaced apart and positioned above the conveyor 510 and the items 520 and 530 so as to scan top surfaces of the items 520 and 530 such as the top surface 522 of the item 520. The front optical scanner 550 may be positioned in front of the conveyor 510 and the items 520 and 530 so as to scan front surfaces of the items 520 and 530 such as the front surface 524 of the item 520 being transported on the conveyor belt 515. At least one of the upper and front optical scanners 540 and 550 may scan geographical area information provided on the items 520 and 530.

Figure 10:
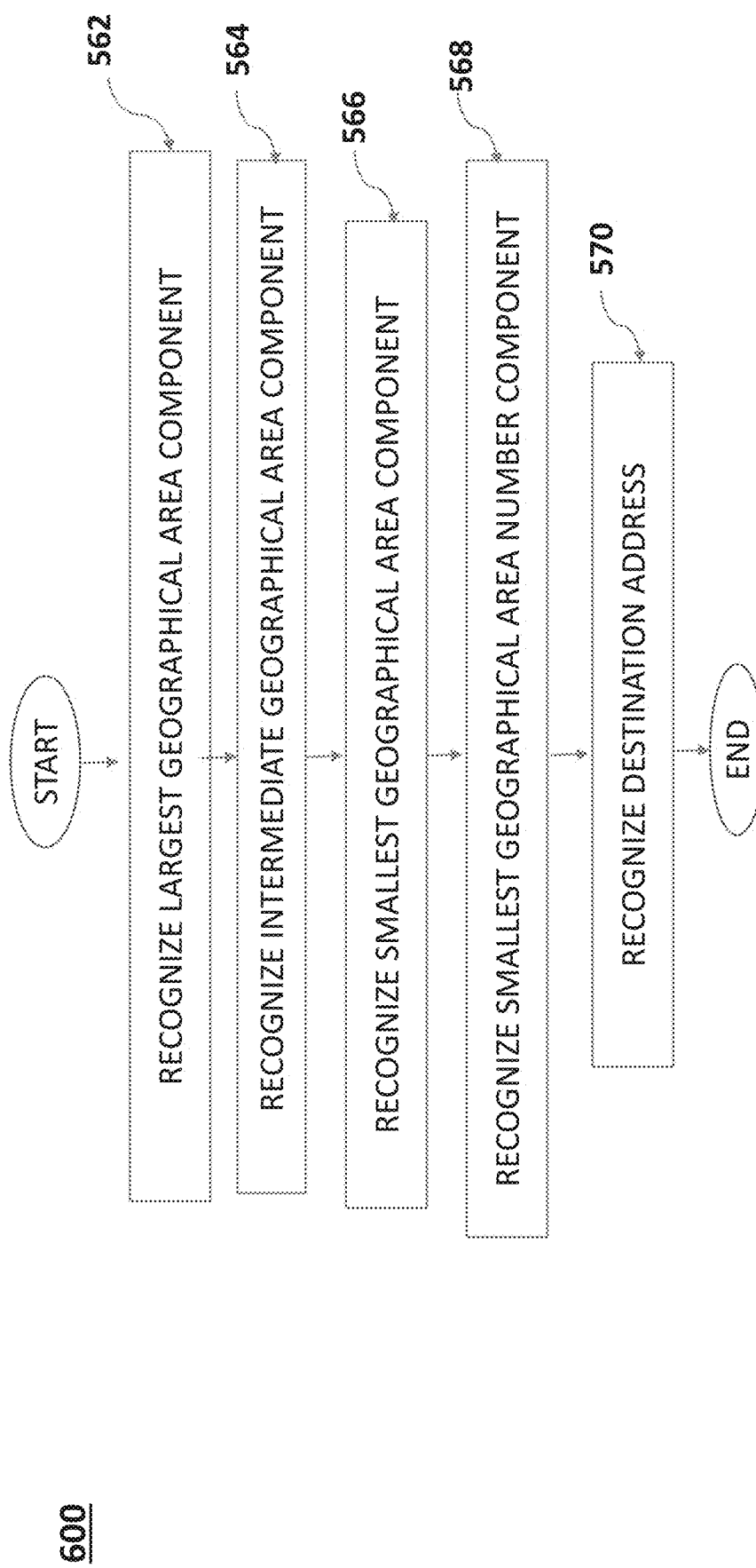
FIG. 10 is a flow diagram of an exemplary method for automatically recognizing geographical area information provided on items without an OCR process according to some embodiments.

FIG. 10 is a flow diagram 600 of an exemplary method for automatically recognizing geographical area information provided on items via the machine learning or deep learning models described herein. For the purpose of convenience, FIG. 10 will be described based on the geographical information being a U.S. style address. The flow diagram 600 may be performed by the third controller 380, or may be performed by any other controller, as desired. For the purpose of the convenience, the description will be made based on the third controller 380 of FIG. 9A performing the flow diagram 600.

The process starts when an image is received in the third controller 380. In state 562, the third controller 380 runs a deep learning model on the received image. The third controller 380 can run the highest level model, for example, a trained state model to recognize a largest geographical area component (e.g., a state) of geographical area information provided on an item. Once the largest geographical area component is identified, such as a state, the process moves to state 564. In state 564, the third controller 380 runs a deep learning model or machine learning model for an intermediate geographical area component (e.g., a city or province) of the geographical area information. The model run to identify the intermediate geographical area component can be selected based on the identified state. That is, when the model identifies a particular state in state 562, the machine learning models trained to recognize cities within the particular state are run, or, the image can be passed to a network specific to the identified state to interpret the city shown in the image. In this way, there is no need to run models or to attempt identification of cities that are not in the identified state. In state 566, the third controller 380 may recognize a smallest geographical area component (e.g., a street) of the geographical area information. Here, similar to the city model, only models or networks for recognizing streets located in the identified city are used. In state 568, the third controller 380 may recognize a smallest geographical area number component (e.g., a street number) of the geographical area information. In state 570, the third controller 380 may recognize the full destination address. Although not shown in FIG. 10, the third controller 380 may recognize a postal code relating to the full destination address.

Figure 11:
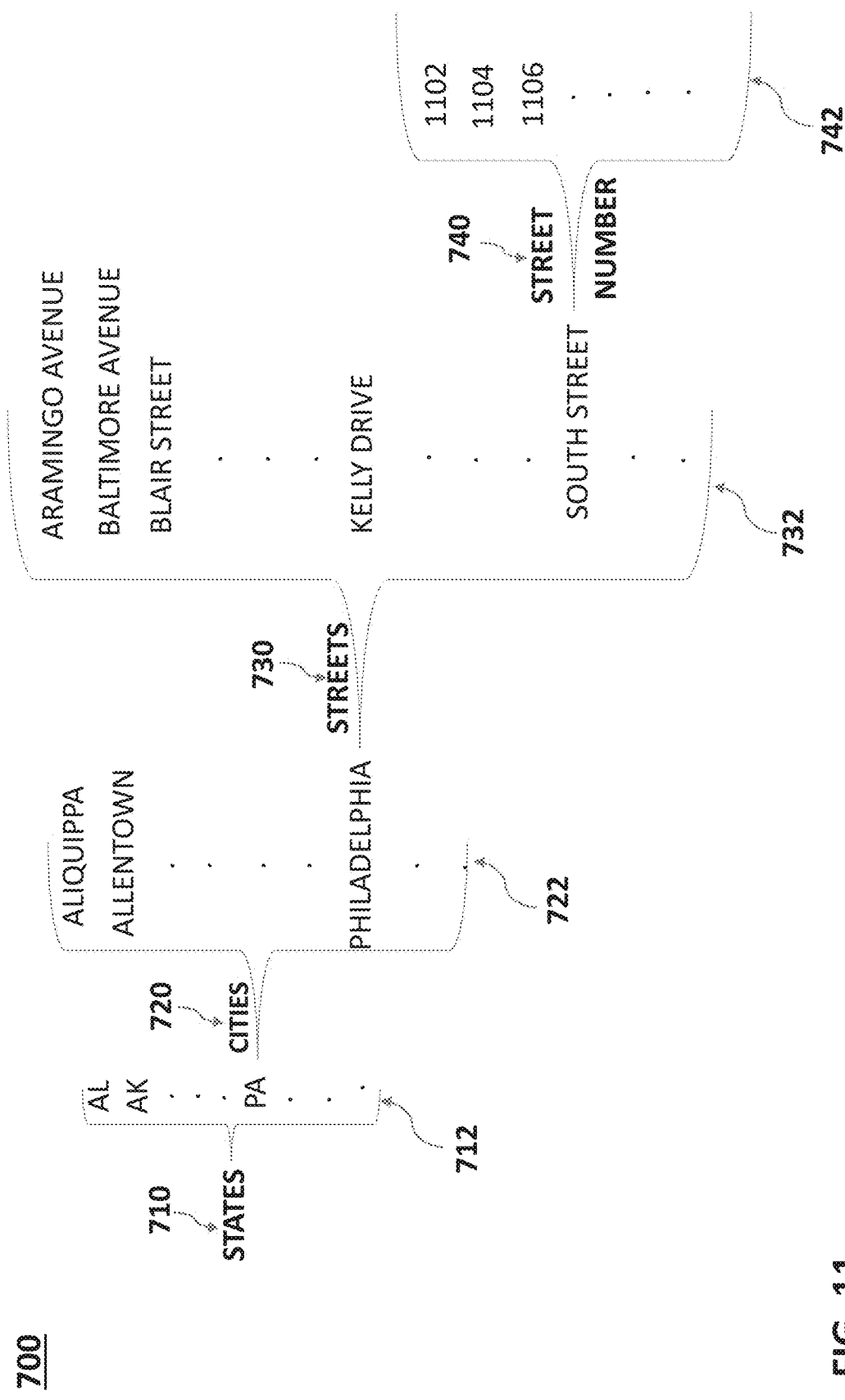
FIG. 11 is an exemplary conceptual diagram showing how geographical area information is organized according to some embodiments.

FIG. 11 is a conceptual diagram showing how geographical area information 700 and machine learning models to recognize geographical area information are organized according to some embodiments. The geographical area information 700 and the associated models may be arranged in a hierarchical structure. The geographical area information may be a U.S. style address that includes states 710, cities 720, streets 730 and street numbers 740. The states 710 may include 50 states and other equivalents 712, such as Washington D.C., and other territories over which the U.S. has sovereignty (hereinafter to be interchangeably used with "member states"). The territories may include, but are not limited to, American Samoa, Guam, the Northern Mariana Islands, Puerto Rico, and the U.S. Virgin Islands. Each of the member states 712 may include member or constituent cities. FIG. 11 shows example member cities 722 of the Pennsylvania (PA) state. Each of the cities may include its own member streets. For example, FIG. 11 shows constituent streets 732 of the Philadelphia city of the PA state. FIG. 11 also shows constituent street numbers 742 of the corresponding street of the Philadelphia city of the Pennsylvania (PA) state. Each of the streets may include its own street numbers. For example, FIG. 11 shows constituent street numbers 742 of the South Street of the Philadelphia city of the PA state. A trained model can exist to recognize states, trained models can exist to recognize cities within each of the states, trained models exist to recognize streets within the cities, etc. These trained models can be stored in the memory 390 or the third controller 380. To illustrate, a model trained to recognize states can recognize Pennsylvania in an image of a distribution item. Then, a trained model trained to recognize cities in Pennsylvania is identified, and that model is run on the image to identify the city. When the Pennsylvania cities model identifies Philadelphia, another model is identified which has been trained to recognize streets in Philadelphia. That model can then be run on the image, and the Philadelphia streets model can identify South Street. In this way, a plurality of trained models can be arranged in a hierarchy, and can be used to identify a complete delivery point from an image of an item. By interpreting images using trained models as described herein, the time required to identify a delivery point can be greatly reduced over that of traditional OCR methods. For example, using systems and networks described herein, a delivery point can be identified in about 2 ms, as compared to 100 ms for a typical OCR process.

Figure 12A:
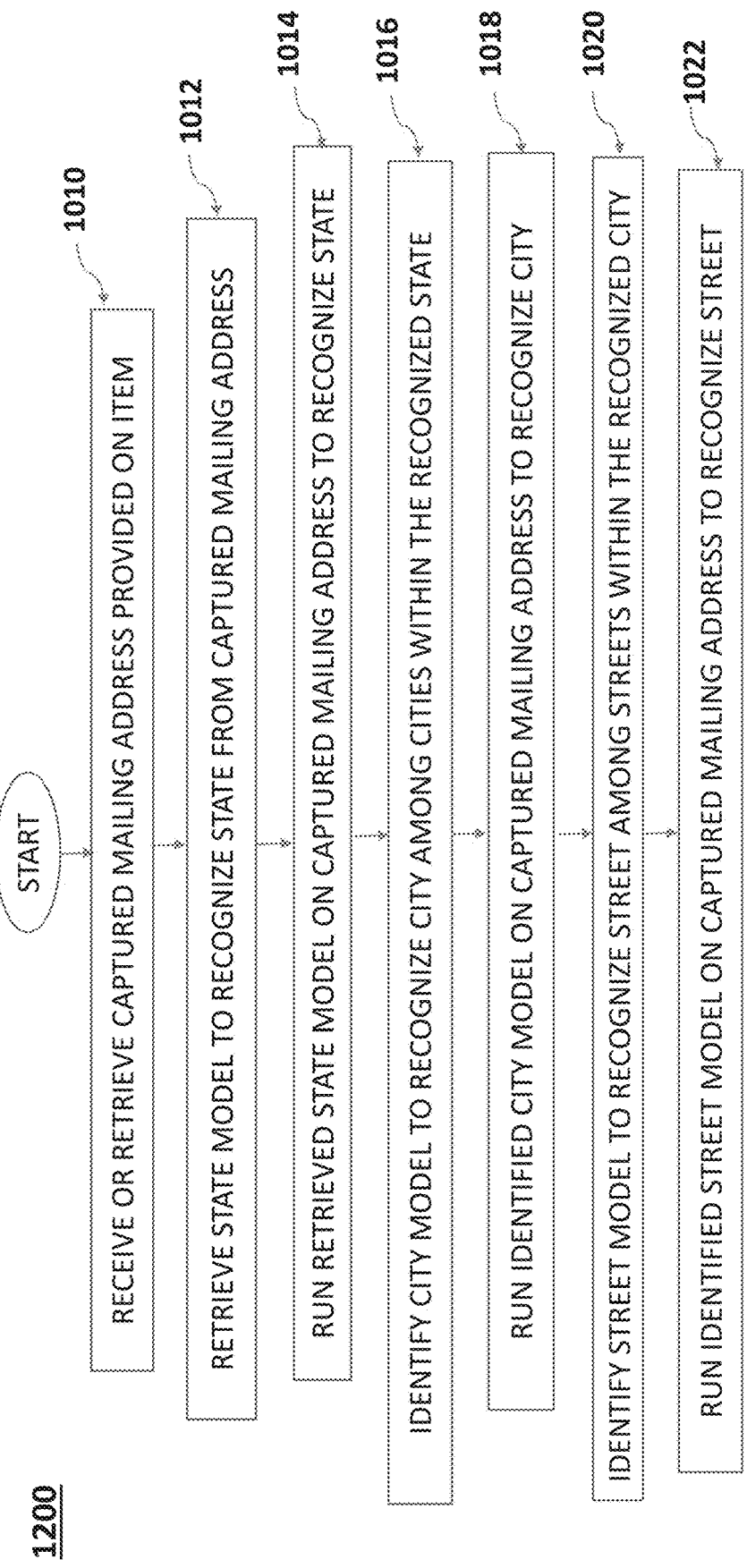

FIGS. 12A and 12B are a flow diagram 1200 of an exemplary method for automatically recognizing geographical area information provided on items without an OCR process according to some embodiments. The flow diagram 1200 may be implemented by a computing device such as the third controller 380 of FIG. 9A. For the purpose of the convenience, the description will be made based on the third controller 380 of FIG. 9A performing the flow diagram 1200. For the purpose of convenience, the description will be provided based on the geographical area information being a U.S. style address. However, addresses in other countries or address in other formats can also be used and recognized.

In state 1010, the third controller 380 may receive or retrieve a captured image 610 of a mailing address provided on an item. The third controller 380 may also receive or retrieve a captured image of an item having a mailing address provided thereon. In some embodiments, the third controller 380 may receive the captured image of the item or mailing address from the optical scanner 420. In other embodiments, the third controller 380 may retrieve the captured image from the memory 390.

In state 1012, the third controller 380 may retrieve a machine learning or deep learning model (hereinafter to be interchangeably used with "state model") trained to recognize states or highest geographical area from the captured address image.

In state 1014, the third controller 380 may run the retrieved state model for the highest level geographic area on the image to identify a state in the image. As described with respect to FIG. 9A, the third controller 380 may store the trained machine learning or deep learning model or retrieve the model from the memory 390. The trained state model for recognizing the state can process the image to identify a state from the image of the item.

In state 1016, the third controller 380 may identify a model (hereinafter to be interchangeably used with "city model") trained to recognize a city among cities, or an intermediate geographic area, within the state or highest geographical area, in the identified state from state 1014.

In state 1018, the third controller 380 may run the identified city model for the intermediate level geographic area on the image to identify a city in the image. As described with respect to FIG. 9A, the third controller 380 may store or retrieve from the memory 390 the trained city model. The trained city model for recognizing the city can process the image to identify a city from the image of the item.

In state 1020, the third controller 380 may identify a model (hereinafter to be interchangeably used with "street model") trained to recognize a street among streets, or a smallest geographic area, within the city or intermediate geographical area, in the identified city from state 1018.

In state 1022, the third controller 380 may run the identified street model for the smallest geographic area on the image to identify a street in the image. As described with respect to FIG. 9A, the third controller 380 may store or retrieve from the memory 390 the trained street model. The trained street model for recognizing the street can process the image to identify a street from the image of the item.

In state 1024, the third controller 380 may identify a model (hereinafter to be interchangeably used with "street number model") trained to recognize a street number among street numbers, or a smallest geographic area number, within the street or smallest geographical area, in the identified street from state 1022.

In state 1026, the third controller 380 may run the identified street number model for the smallest geographic area number on the image to identify a street number in the image. As described with respect to FIG. 9A, the third controller 380 may store or retrieve from the memory 390 the trained street number model. The trained street number model for recognizing the street number can process the image to identify a street number from the image of the item. In some embodiments, the street number may be recognized without machine learning or deep learning (e.g., OCR processing or other image recognition technique).

In state 1028, the third controller 380 may store the fully recognized mailing address in the memory 390 or output the recognized address. In state 1030, the third controller 380 may process the relevant item based on the recognized mailing address such that the item is distributed for delivery to the recognized destination. This way, processing and distribution of the item can be expedited.

Figure 13:
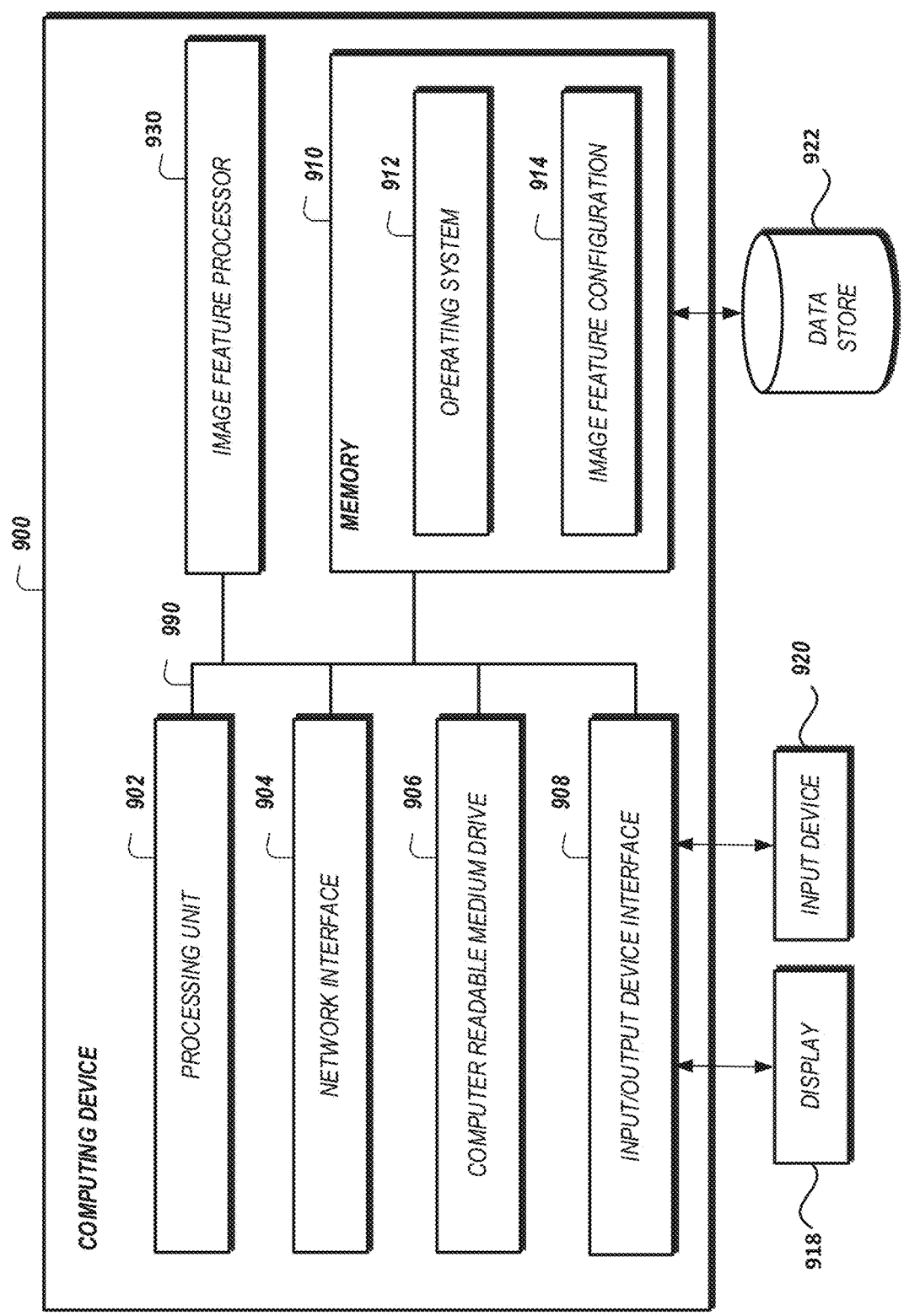
FIG. 13 is a block diagram of an exemplary computing device for building machine learning or deep learning data sets, training a machine learning or deep learning model, or automatically recognizing geographical area information provided on an item without an OCR process according to some embodiments.

FIG. 13 is a block diagram of an embodiment of a computing device 900 for building machine learning or deep learning data sets for automatically recognizing labels or for automatically recognizing labels according to some embodiments. FIG. 13 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. The computing device 900 may implement the features of one or more of the optical scanners 420/540/550, the first controller 220, the second controller 480 or the third controller 380.

The network interface 904 can provide connectivity to one or more networks or computing systems. The network interface 904 can receive information and instructions from other computing systems or services via the network interface 904. The network interface 904 can also store data directly to memory 910. The processing unit 902 can communicate to and from memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more embodiments. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 13. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for automatically recognizing geographical area information provided on an item, the system comprising:
   an optical scanner configured to capture geographical area information provided on an item, the geographical area information comprising a plurality of geographical area components, wherein the geographical area components comprise at least a state, a city, a street, and a street number;
   a memory configured to store a plurality of machine learning or deep learning models, wherein the plurality of machine learning or deep learning models comprises:
      a state machine learning or deep learning model trained to recognize the state from the captured geographical area information, a city machine learning or deep learning model trained to recognize the city from all constituent cities of the recognized state, a street machine learning or deep learning model trained to recognize the street from all constituent streets of the recognized city, and a street number machine learning or deep learning model trained to recognize the street number from all constituent street numbers of the recognized street; and a controller in data communication with the optical scanner and configured to recognize the captured geographical area information by running the plurality of machine learning or deep learning models separately and sequentially on the plurality of geographical area components of the captured geographical area information.

2. The system of claim 1, wherein the state machine learning or deep learning model is configured to communicate data with a plurality of state image databases configured to respectively store images of different states, wherein the city machine learning or deep learning model is configured to communicate data with a plurality of city image databases configured to respectively store images of different cities, and wherein each of the state image databases is configured to communicate data with the plurality of city image databases.

3. The system of claim 2, wherein the street machine learning or deep learning model is configured to communicate data with a plurality of street image databases configured to respectively store images of different streets, and wherein each of the city image databases is configured to communicate data with the plurality of street image databases.

4. The system of claim 3, wherein the street number machine learning or deep learning model is configured to communicate data with a plurality of street number image databases configured to respectively store street number images of all constituent street numbers of each street, and wherein each of the street image databases is configured to communicate data with the plurality of street number image databases.

5. The system of claim 4, wherein the state image databases are configured to store only state images, wherein the city image databases are configured to store only city images, wherein the street image databases are configured to store only street images and wherein the street number image databases are configured to store only street number images.

6. The system of claim 1, wherein the controller is configured to retrieve the state machine learning or deep learning model from the memory and run the retrieved state machine learning or deep learning model to recognize the state from the captured geographical area information, the controller further configured to:

identify the city machine learning or deep learning model from the memory and run the identified city machine learning or deep learning model to recognize the city within the recognized state; and identify the street machine learning or deep learning model from the memory and run the identified street machine learning or deep learning model to recognize the street within the recognized city.

7. The system of claim 6, wherein the controller is configured to identify the street number machine learning or deep learning model from the memory and run the identified street number machine learning or deep learning model to recognize the street number within the recognized street.

8. The system of claim 7, wherein the controller is configured to process the item to be automatically distributed for delivery to the recognized street number.

9. A method of automatically recognizing geographical area information provided on an item, the method comprising:

capturing, at an optical scanner, geographical area information provided on an item, the geographical area information comprising a plurality of geographical area components, wherein the geographical area components comprise at least a state, a city, a street, and a street number;

storing, in a memory, a plurality of machine learning or deep learning models, wherein the plurality of machine learning or deep learning models comprises:

a state machine learning or deep learning model trained to recognize the state from the captured geographical area information, a city machine learning or deep learning model trained to recognize the city from all constituent cities of the recognized state, a street machine learning or deep learning model trained to recognize the street from all constituent streets of the recognized city, and a street number machine learning or deep learning model trained to recognize the street number from all constituent street numbers of the recognized street; and recognizing, at a controller, the captured geographical area information by running the plurality of machine learning or deep learning models separately and sequentially on the plurality of geographical area components of the captured geographical area information.

10. The method of claim 9, wherein the state machine learning or deep learning model is configured to communicate data with a plurality of state image databases configured to respectively store images of different states, wherein the city machine learning or deep learning model is configured to communicate data with a plurality of city image databases configured to respectively store images of different cities, and wherein each of the state image databases is configured to communicate data with a plurality of city image databases configured to respectively store city images of all constituent cities of each state.

11. The method of claim 10, wherein the street machine learning or deep learning model is configured to communicate data with a plurality of street image databases configured to respectively store images of different streets, and wherein each of the city image databases is configured to communicate data with a plurality of street image databases configured to respectively store street images of all constituent streets of each city.

12. The method of claim 10, wherein the street number machine learning or deep learning model is configured to communicate data with a plurality of street number image databases configured to respectively store images of different street numbers, wherein each of the street image databases is configured to communicate data with a plurality of street number image databases configured to respectively store street number images of all constituent street numbers of each street, wherein the state image databases are configured to store only state images, wherein the city image databases are configured to store only city images, wherein the street image databases are configured to store only street images, and wherein the street number image databases are configured to store only street number images.

13. The method of claim 9, wherein the recognizing comprises:
retrieving the state machine learning or deep learning model from the memory and running the retrieved state machine learning or deep learning model to recognize the state from the captured geographical area information;
identifying the city machine learning or deep learning model from the memory and running the identified city machine learning or deep learning model to recognize the city within the recognized state; and
identifying the street machine learning or deep learning model from the memory and running the identified street machine learning or deep learning model to recognize the street within the recognized city.

14. The method of claim 13, wherein the recognizing further comprises:
identifying the street number machine learning or deep learning model from the memory and running the identified street number machine learning or deep learning model to recognize the street number within the recognized street; and
processing the item to be automatically distributed for delivery to the recognized street number.

15. A method of automatically recognizing geographical area information provided on an item, the method comprising:
capturing, at an optical scanner, geographical area information provided on an item, the geographical area information comprising a plurality of geographical area components, wherein the geographical area components comprise two or more of a largest geographical area component, at least one intermediate geographical area component and a smallest geographical area component;
running a first machine learning or deep learning model trained to recognize the largest geographical area component;
subsequent to running the first machine learning or deep learning model, running a second machine learning or deep learning model trained to recognize the at least one intermediate geographical area component within the recognized largest geographical area component; and
subsequent to running the second machine learning or deep learning model, running a third machine learning or deep learning model trained to recognize the smallest geographical area component within the recognized at least one intermediate geographical area component.

16. The method of claim 15, wherein the geographical area components further comprise a smallest geographical area number component, and wherein the recognizing further comprises:
subsequent to running the second machine learning or deep learning model, running a fourth machine learning or deep learning model trained to recognize the smallest geographical area number component within the recognized smallest geographical area component, after running the third machine learning or deep learning model.

\* \* \* \* \*